US008867439B2

(12) United States Patent
Horn et al.

(10) Patent No.: US 8,867,439 B2
(45) Date of Patent: Oct. 21, 2014

(54) METHOD AND APPARATUS FOR ESTABLISHING AN INTERFACE BETWEEN ACCESS POINTS

(75) Inventors: Gavin Bernard Horn, La Jolla, CA (US); Osok Song, San Diego, CA (US); Gang Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 13/096,758

(22) Filed: Apr. 28, 2011

(65) Prior Publication Data

US 2012/0106445 A1 May 3, 2012

Related U.S. Application Data

(60) Provisional application No. 61/330,249, filed on Apr. 30, 2010.

(51) Int. Cl.
*H04W 48/20* (2009.01)
*H04W 8/26* (2009.01)
*H04W 92/20* (2009.01)

(52) U.S. Cl.
CPC ............... *H04W 8/26* (2013.01); *H04W 92/20* (2013.01)
USPC ........... 370/328; 370/331; 370/338; 455/436; 455/437

(58) Field of Classification Search
USPC .......... 370/328, 331, 332, 338; 455/436, 434, 455/437, 441, 442
See application file for complete search history.

(56) References Cited

U.S. PATENT DOCUMENTS

2006/0253612 A1* 11/2006 Cheshire ....................... 709/245
2008/0095080 A1*  4/2008 Danzeisen et al. ............ 370/277

(Continued)

FOREIGN PATENT DOCUMENTS

JP    2009044336 A    2/2009
WO   WO2009045001 A1  4/2009
WO   WO2011085370 A2  7/2011

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), 3GPP Standard; 3GPP TS 36.300, 3rd Generation Partnership Project (3GPP), Mobile Competence Centre ; 650, Route des Lucioles; F-06921 Sophia-Antipolis Cedex ; France, No. V9.3.0, Apr. 27, 2010, pp. 1-166, XP050441450, [retrieved on Apr. 27, 2010].

(Continued)

*Primary Examiner* — Rasheed Gidado
(74) *Attorney, Agent, or Firm* — François A. Pelaez

(57) ABSTRACT

Methods and apparatuses are provided that facilitate establishing an interface for communications between access points. Where access points operate in a same local or enterprise network, an interface can be established via the local or enterprise network instead of (or in addition to) a wireless operator network. A source access point can determine an address over which to request establishment of the interface based at least in part on an identifier of a target access point. In another example, target access point can determine an address to provide to the source access point for establishing the interface based at least in part on an identifier of the source access point.

44 Claims, 17 Drawing Sheets

(56) References Cited

U.S. PATENT DOCUMENTS

| | | | |
|---|---|---|---|
| 2008/0316970 A1* | 12/2008 | Choi .............................. | 370/331 |
| 2009/0042597 A1* | 2/2009 | Yuuki ........................... | 455/525 |
| 2009/0104905 A1* | 4/2009 | DiGirolamo et al. ......... | 455/434 |
| 2009/0268668 A1* | 10/2009 | Tinnakornsrisuphap et al. ............................. | 370/328 |
| 2010/0020753 A1* | 1/2010 | Fulknier et al. ............... | 370/329 |
| 2010/0039992 A1* | 2/2010 | Prakash et al. ................ | 370/328 |
| 2010/0234028 A1* | 9/2010 | Narasimha et al. ........... | 455/437 |
| 2010/0304748 A1* | 12/2010 | Henttonen et al. ............ | 455/436 |
| 2011/0032871 A1* | 2/2011 | Xu et al. ....................... | 370/328 |
| 2011/0171953 A1* | 7/2011 | Faccin et al. ................ | 455/426.1 |

OTHER PUBLICATIONS

Alcatel-Lucent et al., "IP address retrieval for ANRF", 3GPP Draft; R3-090540_IPGAMMAR, 3rd Generation Partnership Project (3GPP), Mobile Competence Centre; 650, Route des Lucioles; F-06921 Sophia-Antipolis Cedex; France, no. Athens, Greece; 20090211, Feb. 11, 2009, XP050325285, [retrieved on Feb. 11, 2009].

International Search Report and Written Opinion—PCT/US2011/034683, ISA/EPO—Sep. 6, 2011.

Nortel: "ANR Neighbors IP address lookup and establishment", GPP Draft; R3-081226_DISCRETRIVEIP@_10.1.1A_ANR.REV0, 3rd Generation Partnership Project (3GPP), Mobile Competence Centre ; 650, Route des Lucioles ; F-06921 Sophia-Antipolis Cedex ; France, vol. RAN WG3, no. Kansas City, USA; 20080430, Apr. 30, 2008, XP050164407, [retrieved on Apr. 30, 2008].

3GPP TS 36.300, "LTE; Evolved Universal Terrestrial Radio Access (E-UTRA) and Evolved Universal Terrestrial Radio Access Network (E-UTRAN); Overall description," ETSI TS 136 300, version 9.1.0 Release 9, Oct. 2009, 169 pages.

* cited by examiner

METHOD AND APPARATUS FOR ESTABLISHING AN INTERFACE BETWEEN ACCESS POINTS

CLAIM OF PRIORITY UNDER 35 U.S.C. §119

The present application for patent claims priority to Provisional Application No. 61/330,249 entitled "SYSTEMS, METHODS AND DEVICES TO ENABLE SETUP OF A DIRECT INTERFACE IN A WIRELESS NETWORK" filed Apr. 30, 2010, and assigned to the assignee hereof and hereby expressly incorporated by reference herein.

BACKGROUND

1. Field

The following description relates generally to wireless network communications, and more particularly to establishing an interface between access points.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional base stations can be deployed to provide more robust wireless coverage to mobile devices. For example, low power base stations (e.g., Home NodeBs or Home eNBs, collectively referred to as H(e)NB, femto access points, femtocells, picocells, microcells, etc.) can be deployed for incremental capacity growth, richer user experience, in-building or other specific geographic coverage, and/or the like. In some configurations, such low power base stations are connected to the Internet and the mobile operator network via broadband connection (e.g., digital subscriber line (DSL) router, cable or other modem, etc.). In an example, base stations, H(e)NBs, etc., can communicate with one another using a backhaul interface (e.g., over an X2 interface) through a wireless operator network. In one example, the base stations, H(e)NBs, etc., can communicate device context information for handing over communications from the device, etc. Moreover, some H(e)NBs associate with a closed subscriber group (CSG) for restricting access (or providing an improved level of access) to certain devices or related users that are members of the CSG. In some cases, such H(e)NBs can be part of a same local network—e.g., an internet protocol (IP) network at an enterprise—over which the H(e)NBs can access the wireless operator network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with establishing an interface between low power base stations in a wireless operator network. For example, low power base stations in the wireless operator network can connect to a same local network in accessing the wireless operator network. In this example, to establish an interface between access points within the local network, at least one of the access points can communicate a local network address to another access point, and the interface can be established between the access points within the local network using the local network address. In this regard, the interface is not established over a remote network of a wireless operator, which can improve throughput over the interface by not requiring traversal of remote network nodes of the wireless operator, which can conserve resources on the wireless operator network, and/or the like.

According to an example, a method of wireless communication is provided. The method includes generating a request for an address of a target access point that includes an identifier based at least in part on determining that the target access point is a restricted access point and transmitting the request to the target access point.

In another aspect, an apparatus for requesting access point information is provided. The apparatus includes at least one processor configured to generate a request for an address of a target access point that includes an identifier based at least in part on determining that the target access point is a restricted access point. The at least one processor is further configured to transmit the request to the target access point. The apparatus also includes a memory coupled to the at least one processor.

In yet another aspect, an apparatus for requesting access point information is provided that includes means for transmitting a request for an address of a target access point that includes an identifier based at least in part on determining that the target access point is a restricted access point. The apparatus further includes means for receiving a network address of the target access point.

Still, in another aspect, a computer-program product for requesting access point information is provided including a computer-readable medium having code for causing at least one computer to transmit a signal that advertises an association with a CSG and code for causing at least one computer to generate a request for an address of a target access point that includes an identifier based at least in part on determining that the target access point is a restricted access point. The computer-readable medium further includes code for causing the at least one computer to transmit the request to the target access point.

Moreover, in an aspect, an apparatus for requesting access point information is provided that includes an address requesting component for transmitting a request for an address of a target access point that includes an identifier based at least in part on determining that the target access point is a restricted access point. The apparatus further includes an address receiving component for obtaining a network address of the target access point.

According to another example, a method of wireless communication is provided. The method includes receiving a request for an address including an identifier from a source access point and determining at least one of a plurality of assigned addresses to provide to the source access point based at least in part on the identifier. The method further includes transmitting the at least one of the plurality of assigned addresses to the source access point.

In another aspect, an apparatus for providing access point information is provided. The apparatus includes at least one processor configured to receive a request for an address including an identifier from a source access point and determine at least one of a plurality of assigned addresses to provide to the source access point based at least in part on the identifier. The at least one processor is further configured to transmit the at least one of the plurality of assigned addresses to the source access point. The apparatus also includes a memory coupled to the at least one processor.

In yet another aspect, an apparatus for providing access point information is provided that includes means for receiving a request for an address including an identifier from a source access point. The apparatus further includes means for transmitting at least one of a plurality of assigned addresses to the source access point, wherein the means for transmitting determines the at least one of the plurality of assigned addresses based at least in part on the identifier.

Still, in another aspect, a computer-program product for providing access point information is provided including a computer-readable medium having code for causing at least one computer to receive a request for an address including an identifier from a source access point. The computer-readable medium further includes code for causing the at least one computer to determine at least one of a plurality of assigned addresses to provide to the source access point based at least in part on the identifier and code for causing the at least one computer to transmit the at least one of the plurality of assigned addresses to the source access point.

Moreover, in an aspect, an apparatus for providing access point information is provided that includes an address request receiving component for obtaining a request for an address including an identifier from a source access point. The apparatus further includes an address providing component for transmitting at least one of a plurality of assigned addresses to the source access point, wherein the address providing component determines the at least one of the plurality of assigned addresses based at least in part on the identifier.

According to a further example, a method of wireless communication is provided. The method includes receiving a plurality of addresses from a target access point and determining at least one of the plurality of addresses to utilize in communicating with the target access point based at least in part on a received parameter. The method further includes establishing an interface with the target access point using the at least one of the plurality of addresses.

In another aspect, an apparatus for receiving access point information is provided. The apparatus includes at least one processor configured to receive a plurality of addresses from a target access point and determine at least one of the plurality of addresses to utilize in communicating with the target access point based at least in part on a received parameter. The at least one processor is further configured to establish an interface with the target access point using the at least one of the plurality of addresses. The apparatus also includes a memory coupled to the at least one processor.

In yet another aspect, an apparatus for receiving access point information is provided that includes means for receiving a plurality of addresses from a target access point. The apparatus further includes means for establishing an interface with the target access point based at least in part on determining at least one of the plurality of addresses to utilize in communicating with the target access point based at least in part on a received parameter.

Still, in another aspect, a computer-program product for receiving access point information is provided including a computer-readable medium having code for causing at least one computer to receive a plurality of addresses from a target access point and code for causing the at least one computer to determine at least one of the plurality of addresses to utilize in communicating with the target access point based at least in part on a received parameter. The computer-readable medium further includes code for causing the at least one computer to establish an interface with the target access point using the at least one of the plurality of addresses.

Moreover, in an aspect, an apparatus for receiving access point information is provided that includes an address receiving component for receiving a plurality of addresses from a target access point. The apparatus further includes an interface establishing component for requesting establishment of an interface with the target access point based at least in part on determining at least one of the plurality of addresses to utilize in communicating with the target access point based at least in part on a received parameter.

Furthermore, according to an example, a method of wireless communication is provided. The method includes receiving a plurality of addresses assigned by one or more network components and receiving a request from a source access point for an address. The method further includes providing the plurality of addresses to the source access point.

In another aspect, an apparatus for providing access point information is provided. The apparatus includes at least one processor configured to receive a plurality of addresses assigned by one or more network components and receive a request from a source access point for an address. The at least one processor is further configured to provide the plurality of addresses to the source access point. The apparatus also includes a memory coupled to the at least one processor.

In yet another aspect, an apparatus for providing access point information is provided that includes means for receiving a plurality of addresses assigned by one or more network components and means for receiving a request from a source access point for an address. The apparatus further includes means for providing the plurality of addresses to the source access point.

Still, in another aspect, a computer-program product for providing access point information is provided including a computer-readable medium having code for causing at least one computer to receive a plurality of addresses assigned by one or more network components and code for causing the at least one computer to receive a request from a source access point for an address. The computer-readable medium further includes code for causing the at least one computer to provide the plurality of addresses to the source access point.

Moreover, in an aspect, an apparatus for providing access point information is provided that includes a network address component for receiving a plurality of addresses assigned by one or more network components and an address request receiving component for obtaining a request from a source access point for an address. The apparatus further includes an address providing component for communicating the plurality of addresses to the source access point.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
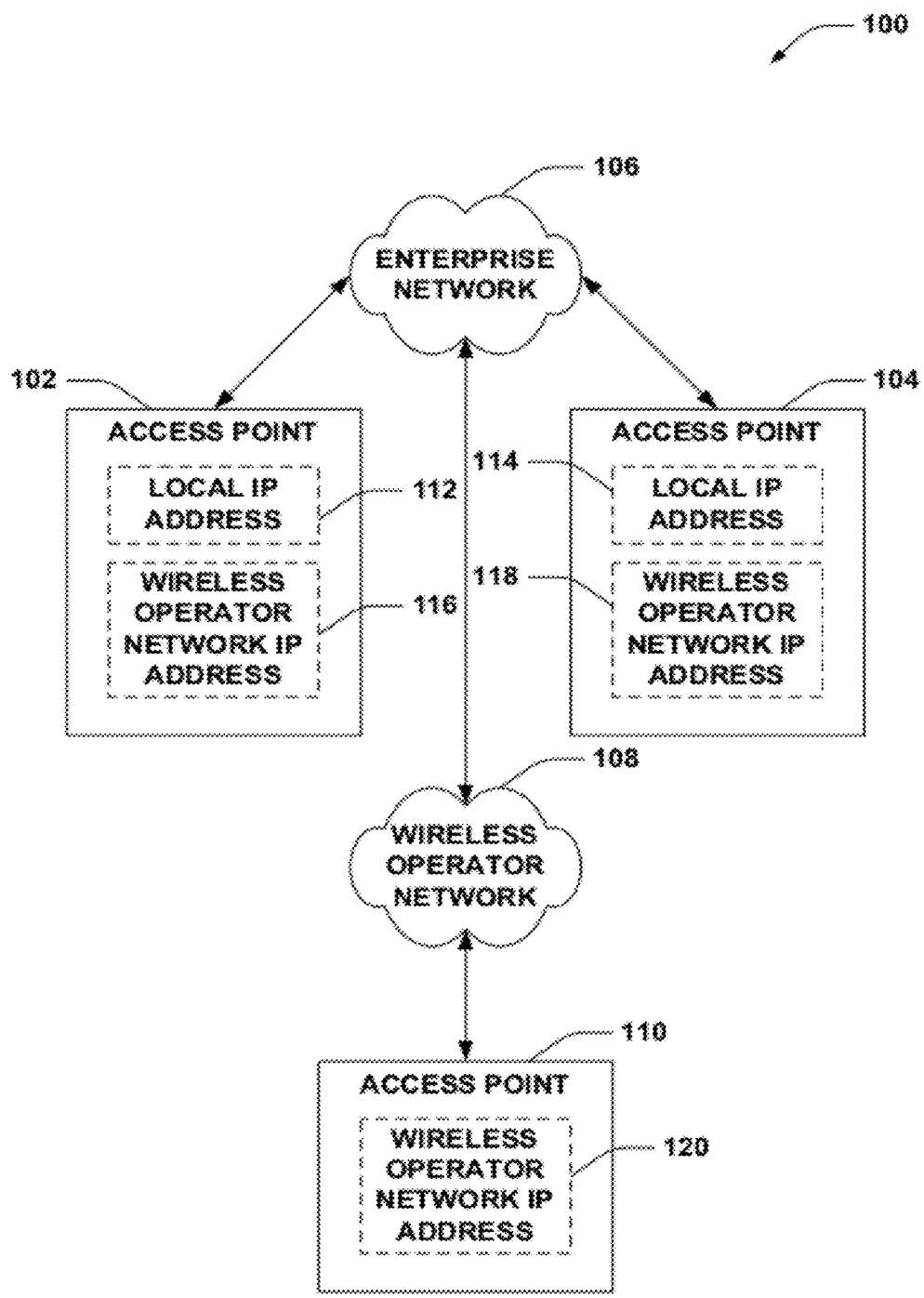
FIG. 1 is a block diagram of an aspect of a system that facilitates allowing interface establishment among various access points.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, an interface can be established between access points in a wireless network, such as a low power base station, which can include a home node B (HNB), home evolved node B (HeNB), collectively referred to herein as H(e)NBs, and/or the like. The interface can be setup over a wireless operator network or over a local network depending on access point configuration. For example, where access points are configured in a same local network, an interface can be setup between the access points using the local network instead of the wireless operator network. In one example, the access points can receive network addresses from the local network, and can utilize the local addresses to communicate without traversing the wireless operator network. This can improve throughput of the interface, allow utilization of local network security, and/or the like.

In a specific example, the access points are H(e)NBs, or similar access points that can utilize a broadband Internet connection (e.g., digital subscriber line (DSL), cable, T1/T3, etc.) to communicate with a wireless operator network, and can communicate in a local network over which Internet access is provided. For example, an enterprise can have multiple H(e)NBs to provide wireless operator network access at different areas within the enterprise. Where the H(e)NBs are within the same enterprise and can thus communicate over an enterprise local network, for example, an interface between the H(e)NBs can be established over the enterprise local network (e.g., using network addresses assigned for communicating in the enterprise local network).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that facilitates establishing interfaces for communications between one or more access points. For illustration purposes, various aspects of the disclosure are described in the context of one or more access points that communicate with one another. It is to be appreciated, however, that aspects herein may be applicable to other types of apparatuses or other similar apparatuses that are referenced using other terminology. For example, access points can be referred to or implemented as low power base stations, such as H(e)NBs, femtocell or picocell access points, mobile base stations, relay nodes, hot-spots, routers, gateways, other base stations, etc.

System 100 comprises an access point 102 that communicates with at least one or more other access points, such as access point 104 and/or access point 110, over an interface. For example, in an LTE configuration, the interface can include an X2 or similar backhaul interface defined for communicating among access points. In the depicted example, access points 102 and 104 can be part of an enterprise network 106, through which the access points 102 and 104 can access a wireless operator network 108 (e.g., to provide wireless operator network 108 access to one or more devices (not shown)). For example, the wireless operator network 108 can be a mobile operator core network, such as an LTE, UMTS, or similar network, etc., that can additionally provide access to one or more networks, such as the Internet, and/or the like. System 100 additionally comprises an access point 110, with which access point 102 and/or 104 can communicate by traversing one or more nodes of wireless operator network 108.

As access points 102 and 104 communicate in enterprise network 106, access points 102 and 104 can each receive a local internet protocol (IP) address 112 and 114 from one or more components of enterprise network 106 for communicating within the enterprise network 106. In addition, access points 102 and 104 can receive wireless operator network IP addresses 116 and 118 from wireless operator network 108 for communicating in wireless operator network 108 (e.g., via enterprise network 106). In an example, access points 102 and 104 can be authenticated on the wireless operator network 108 via one or more components thereof, such as a security gateway, and can receive the wireless operator network IP addresses 116 and 118 that can correspond to IP security (IPSec) or similar secure communications tunnels through the security gateway to other nodes of wireless operator network 108. Though shown and described using IP for network protocol communications, it is to be appreciated that aspects described herein can additionally or alternatively utilize other network addressing and communication technologies, such as mobile IP, user datagram protocol (UDP), etc.

In addition, access point 110 can communicate in wireless operator network 108 for providing access to one or more devices (not shown). Thus, access point 110 is also assigned wireless operator network IP address 120 from wireless operator network 108. In an example access points 102, 104, and/or 110 can establish an interface with one another through wireless operator network 108, according to wireless operator network IP addresses 116, 118, and/or 120. For example, the access points 102, 104, and/or 110 can establish the interface for communicating information shared among access points (e.g., device context information for handover, metrics for load balancing, and/or the like). Thus, communications between access points 102, 104, and/or 110 can traverse various nodes in wireless operator network 108 to ensure access points 102, 104, and/or 110 are authorized to communicate in wireless operator network 108.

Since access points 102 and 104 communicate over enterprise network 106, however, in an example access point 102 and 104 can establish an interface for communicating over enterprise network 106 without traversing nodes of wireless operator network 108. In this example, access points 102 and/or 104 can specify local IP addresses 114 and/or 112, respectively, to communicate with one another. In one example, access point 102 can obtain at least local IP address 114 from access point 104, and can accordingly request establishment of an interface with access point 104 using local IP address 114. For example, access point 102 can request address information for access point 104, which can include requesting such from a component of wireless operator network 108 and/or utilizing the wireless operator network 108 to communicate the request to access point 104. For instance, access point 102 can acquire one or more addresses of access point 104 from an operation, administration, and management (OAM) server, using automatic neighbor relation (ANR), and/or the like.

In one example, access point 102 can specify one or more identifiers in a request for address information of access point 104. In an example, the one or more identifiers can indicate that access point 102 is part of the enterprise network 106 and/or part of a restricted association group corresponding to the enterprise network 106, etc. In this example, a node that provides the address information (e.g., access point 104 or another node of enterprise network 106) can determine whether to provide local IP address 114 and/or wireless operator network IP address 118 based at least in part on the one or more identifiers (e.g., local IP address 114 can be provided where the identifier indicates that access point 102 is or may be in enterprise network 106, that access point 102 is a H(e)NB or other type of access point that is not a macrocell access point, etc.). In another example, local IP address 114 and wireless operator network IP address 118 can be provided to access point 102 based on requesting address information. In this example, access point 102 can determine which address 114 or 118 to use based at least in part on one or more additional parameters (e.g., a similar identifier of access point 104 that indicates whether access point 104 communicates over enterprise network 106, etc.). Access point 102 can establish an interface with access point 104 using the address. Moreover, for example, access point 102 can attempt to establish an interface with access point 104 using both addresses 114 and 118 and can utilize whichever is successful.

In another example, access point 110 can request information regarding access point 104 (e.g., from access point 104, or one or more components of wireless operator network 108) for establishing an interface therewith. For example, access point 110 can indicate to access point 104 that it is a macrocell access point. In this example, access point 104 can provide wireless operator network IP address 118 to access point 110 for establishing the interface. In another example, access point 104 can provide both addresses 114 and 118, and access point 110 can determine to use wireless operator network IP address 118 since it is a macrocell access point.

Figure 2:
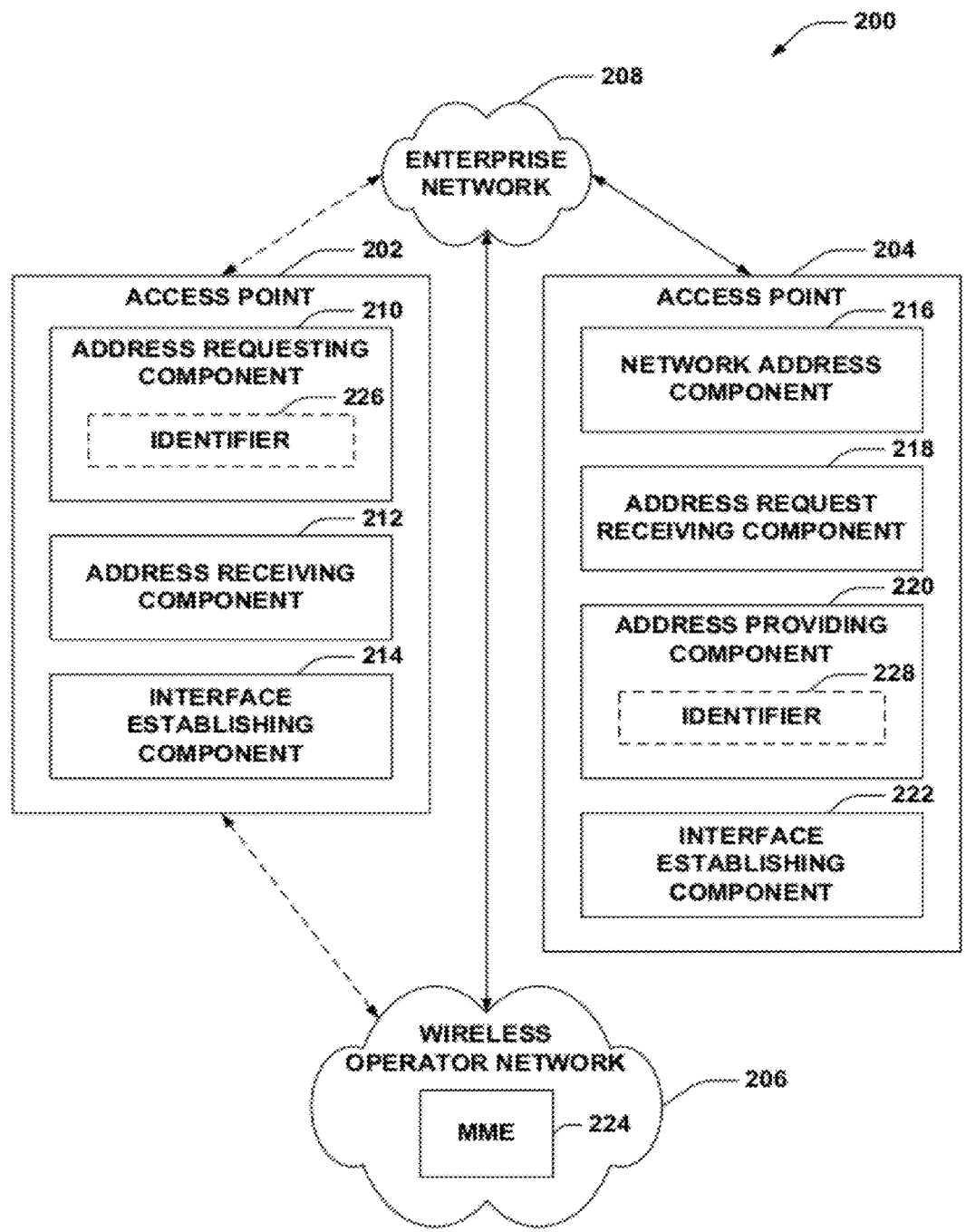
FIG. 2 is a block diagram of an aspect of a system for establishing access point interfaces.

Turning to FIG. 2, an example wireless communication system 200 is illustrated that facilitates establishing an interface between access points in a wireless communication network. System 200 can include an access point 202 and access point 204, which can be part of a same wireless operator network 206, and can access the wireless operator network 206 through one or more connections. For example, access point 204 can communicate in enterprise network 208; in an example, access point 204 can be a H(e)NB or similar access point that can be a part of a local network over which access point 204 can access wireless operator network 206. In one example, access point 202 can also communicate in enterprise network 208 (e.g., to access wireless operator network 206). In another example, access point 202 can be a macrocell access point that communicates with wireless operator network 206 via a radio network controller (RNC) or similar component that facilitates communicating with other components of wireless operator network 206.

Access point 202 comprises an address requesting component 210 for generating requests for information regarding one or more access points, an address receiving component 212 for obtaining one or more network addresses of the one or more access points, and an interface establishing component 214 for initiating a request for establishing an interface to the one or more access points based on the one or more network addresses. Access point 204 can comprise a network address component 216 for obtaining one or more network addresses from one or more networks for communicating thereover, and an address request receiving component 218 for obtaining a request for a network address. Access point 204 further comprises an address providing component 220 for communicating one or more of the network addresses to a requesting entity, and an interface establishing component 222 for facilitating establishing an interface for communicating with the requesting entity. It is to be appreciated that access points 202 and 204 can comprise similar components to provide functionality described herein at each access point 202 and/or 204.

In one example, as described, access point 204 can be a H(e)NB that is coupled to an enterprise network 208 to receive access to resources of the enterprise network 208 (e.g., a broadband Internet connection). In this example, network address component 216 can obtain a local address from enterprise network 208 for communicating with one or more components in the enterprise network 208. In addition, access point 204 registers with wireless operator network 206 (e.g., over the broadband Internet connection through enterprise network 208). In an example, access point 204 can register with a mobility management entity (MME) 224, or similar component of wireless operator network 206, such as a serving general packet radio service (GPRS) support node (SGSN), and/or the like. In this example, network address component 216 can also receive a wireless operator network address from wireless operator network 206 (e.g., assigned by one or more gateways thereof). As described, access point 204 can be authenticated at wireless operator network 206, and thus the wireless operator network address can be related to a secure communications tunnel established between access point 204 and wireless operator network 206 through enterprise network 208.

Interface establishing component 214 can determine to establish an interface with access point 204 for communicating therewith. For example, this can be based at least in part on one or more neighbor detection procedures that detect presence of access point 204, which can include receiving signals from access point 204, receiving information regarding access point 204 in a measurement report from one or more devices (not shown), determining to handover communications of the one or more devices to access point 204 based on the measurement report, and/or the like. In this regard, for example, address requesting component 210 can generate and transmit a request for a network address and/or other information to access point 204, or to one or more components of wireless operator network 206 based on a received identifier of access point 204 (e.g., received as part of the neighbor detection procedure). For example, this can be part of ANR, a request to an OAM server, or a similar procedure in LTE, etc. For example, address requesting component 210 can request the information from MME 224 or another component of wireless operator network 206, where the information requested can relate to one or more addresses or other identifiers of access point 204. In this example, MME 224 can accordingly request the information from access point 204, an OAM, or a similar component.

Address request receiving component 218 can obtain the request from MME 224, and address providing component 220 can determine the local address and/or wireless operator network address from network address component 216 for communicating to access point 202. Address providing component 220, in this example, can transmit the addresses to MME 224, which can provide the addresses to access point 202. Address receiving component 212 can obtain the addresses, and interface establishing component 214 can at least one of determine which address to utilize in establishing an interface to access point 204, attempt to establish an interface with access point 204 by trying one or more addresses, etc., where multiple addresses are provided. When the correct address is utilized, interface establishing component 222 can obtain the request to establish the interface, and can respond to access point 202 to establish an X2 or similar backhaul interface with access point 202.

In a specific example, address providing component 220 can obtain the network addresses from network address component 216, and can include a label for the addresses (e.g., as a parameter with the addresses in one or more data structures), which can indicate whether each address is a local network address, an address accessible in a wireless operator network, etc. In this example, address receiving component 212 can obtain the addresses and labels (e.g., over wireless operator network 206, MME 224, etc.), and interface establishing component 214 can utilize an address with a label indicating the address is a wireless operator network 206 address to establish the interface with access point 204, since access point 202 does not communicate in enterprise network 208 or another local network with access point 204. Interface establishing component 222 can receive the request to establish an interface from access point 202 (e.g., over wireless operator network 206, MME 224, etc.), and can setup the interface therewith, as described.

In another example, address requesting component 210 can indicate that access point 202 is a macrocell in the request to establish the interface and/or a message related thereto. In one example, this can include specifying an identifier 226 of source access point 202 in the request, where the identifier 226 can be used to determine whether source access point 202 is a macrocell access point or not (e.g., based on the identifier 226 being a physical cell identifier within a range of physical cell identifiers reserved for macrocell access points—or not reserved for H(e)NBs—etc.). In this example, address request receiving component 218 can obtain the request and/or other message (e.g., through wireless operator network 206, MME 224, etc.) and can determine that access point 202 is a macrocell access point based on the identifier 226, etc. Thus, address providing component 220 can acquire the wireless operator network address of access point 204 from network address component 216, and can provide the wireless operator network address to access point 202 (e.g., via wireless operator network 206, MME 224, etc.). Address receiving component 212 can receive the wireless operator network address, and interface establishing component 214 can utilize the wireless operator network address to establish the interface with access point 204.

In another example, similarly to access point 204, access point 202 can communicate in enterprise network 208, receiving a local address from one or more components thereof, and can utilize enterprise network 208 to access wireless operator network 206. Thus, access point 202 can also register with MME 224 and receive a wireless operator network address therefrom and/or from one or more other nodes of wireless operator network 206, as described.

In this example, interface establishing component 214 can determine to establish an interface with access point 204, as described above (e.g., based on detecting access point 204 through one or more neighbor detection procedures, such as receiving signals, receiving information in a measurement report, etc.). Thus, address requesting component 210 can request an address or other information regarding access point 204. In one example, as described, address request receiving component 218 can receive the request (e.g., via wireless operator network 206, MME 224, etc.), and address providing component 220 can transmit both the local address and wireless operator network address to access point 202, with or without labels. In an example, address providing component 220 can additionally include an identifier 228 specifying that access point 204 communicates in enterprise network 208. For example, this can be a closed subscriber group (CSG) identifier, where the access points in enterprise network 208 advertise or are otherwise associated with a similar CSG identifier.

Thus, address receiving component 212 can obtain the local address and wireless operator network address from access point 204 (e.g., via wireless operator network 206, MME 224, etc.) along with the identifier 228. Interface establishing component 214 can determine which address to utilize in establishing an interface with access point 204 based at least in part on the identifier 228. For example, where the identifier 228 specifies that access point 204 communicates in enterprise network 208, which is the same enterprise network 208 with which access point 202 communicates (e.g., where a reported CSG identifier is similar to one or more local CSG identifiers related to source access point 202), interface establishing component 214 can determine to establish the interface using the local address. For example, interface establishing component 214 can determine the local address based at least in part on the label, on a portion of the address (e.g., a number of leading octets in the address, a prefix, etc.), a type of the address (e.g., a local link address or a global IP address, an IPv4 or IPv6 address, etc.), and/or the like. In another example, interface establishing component 214 can determine the CSG identifier of access point 204 as reported in a measurement report received from the one or more devices, and can select the local address based at least in part on the CSG identifier.

In another example, address requesting component 210 can specify a similar identifier 226 in the request for establishing the interface. For example, the identifier 226 can specify whether access point 202 communicates in enterprise network 208 and/or can specify an enterprise network. Thus, the identifier 226 can similarly be a CSG identifier, and/or the like. For example, address requesting component 210 can determine whether to include the identifier 226 based at least in part on determining access point 204 associates with a CSG and/or is an H(e)NB. For example, address requesting component 210 can determine this based at least in part on an identifier of access point 204 (e.g., received from one or more devices in a measurement report, from signaling received from access point 204, or other neighbor detection procedure, as described), one or more CSG identifiers associated with (e.g., local to) access point 204, and/or the like. Address request receiving component 218 can obtain the request with the identifier 226 (e.g., via wireless operator network 206, MME 224, etc., as described), and address providing component 220 can determine whether access point 202 communicates with enterprise network 208. For example, this can be determined based at least in part on comparing the received identifier 226 with one or more local CSG identifiers associated with access point 204. If the identifiers match, for example, address providing component 220 can determine access point 202 communicates in the same enterprise network 208 as access point 204.

Where address providing component 220 determines such, address providing component 220 can obtain a local address from network address component 216, and can provide the local address to access point 202. Similarly, where address providing component 220 determines that access point 202 does not communicate with the same enterprise network 208, address providing component 220 can obtain the wireless operator network address from network address component 216 and provide to access point 202. Address receiving component 212, in either case, can receive the address (e.g., via wireless operator network 206, MME 224, etc.), and interface establishing component 214 can utilize the address to establish an interface with access point 204, as described.

Figure 3:
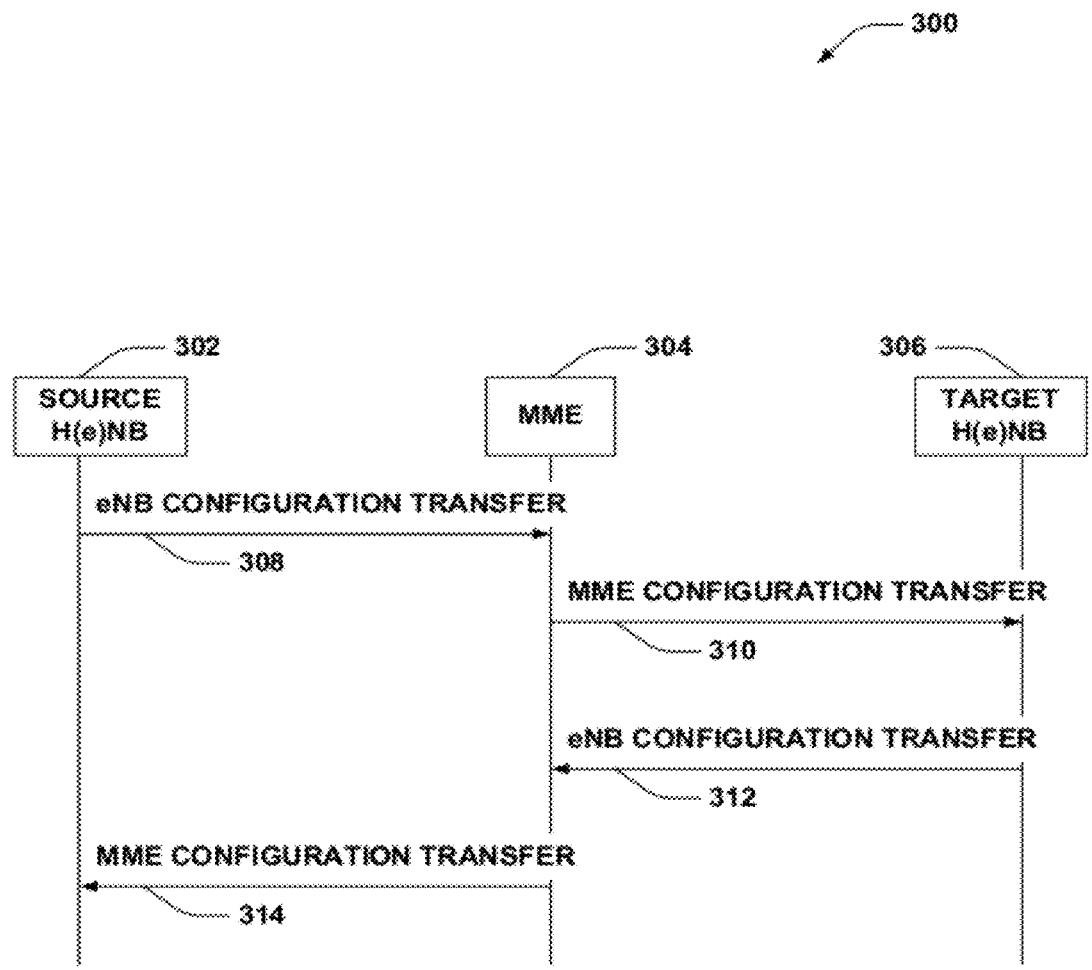
FIG. 3 is an example message flow diagram of an aspect of providing target access point information to a source access point.

Referring to FIG. 3, an example message flow diagram of a system 300 is illustrated for establishing an interface between H(e)NBs. System 300 comprises a source H(e)NB 302 that communicates with an MME 304 of a wireless operator network. System 300 also comprises a target H(e)NB 306 that communicates with the MME 304 as well. As described, the source H(e)NB 302 and target H(e)NB 306 can communicate with MME 304 using a common or different enterprise network that can access the wireless operator network of MME 304 (e.g., via a broadband Internet connection). Source H(e)NB 302, for example, can determine to obtain information regarding target H(e)NB 306 (e.g., for establishing an interface therewith, as described). In this example, source H(e)NB 302 can transmit an eNB configuration transfer 308 to MME 304 to request information regarding target H(e)NB 306. As described, for example, the eNB configuration transfer 308 can include a request for an address of target eNB 306 and/or can include an identifier of source H(e)NB 302, which can be used to determine whether source H(e)NB 302 is a macrocell access point. In addition, for example, source H(e)NB 302 can include a CSG identifier as part of the eNB configuration transfer 308 (or a separate related message).

MME 304 can receive the message and forward to target H(e)NB 306 in a MME configuration transfer 310. Target H(e)NB 306 can receive the message and can return one or more IP addresses in an eNB configuration transfer 312. As described, for example, target H(e)NB 306 can return one or both of a local IP address, an IP address for the wireless operator network (e.g., assigned by a security gateway), etc. For example, target H(e)NB 306 can determine a CSG identifier of source H(e)NB 302 (e.g., in the MME configuration transfer 310). If the CSG identifier is different from one or more local CSG identifiers of target H(e)NB 306, and/or if target H(e)NB 306 operates in an open access mode, target H(e)NB 306 can return the IP address assigned by the wireless operator network in the eNB configuration transfer 312. If the CSG identifier is the same, target H(e)NB 306 can include the local IP address in the eNB configuration transfer 312. In another example, as described, target H(e)NB 306 can send both addresses in the eNB configuration transfer 312. MME 304 can receive the eNB configuration transfer 312 and forward to source H(e)NB 302 in MME configuration transfer 314.

Source H(e)NB 302 can obtain MME configuration transfer 314 from MME 304, and can establish an X2 interface with target H(e)NB 306 based at least in part on at least one address indicated in the MME configuration transfer 314. For example, if the MME configuration transfer 314 includes two or more addresses for target H(e)NB 306, source H(e)NB 302 can attempt to utilize both addresses to establish the interface and utilize whichever establishes the interface successfully. In another example, source H(e)NB 302 can determine whether target H(e)NB 306 is a member of a same CSG as source H(e)NB 302 (e.g., based at least in part on a CSG identifier reported in a measurement report from one or more devices, a CSG identifier in MME configuration transfer 314, etc.). If so, source H(e)NB 302 can determine which address is a local IP address (e.g., based on one or more address labels, one or more octets of the addresses, and/or the like), and can establish the interface using the local IP address. In addition, target H(e)NB 306 can determine whether to accept an interface establishment request from source H(e)NB 302 based at least in part on an IP address in the request, a CSG identifier, etc., as described.

Referring to FIGS. 4-7, example methodologies relating to communicating addresses for establishing interfaces among access points are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 4:
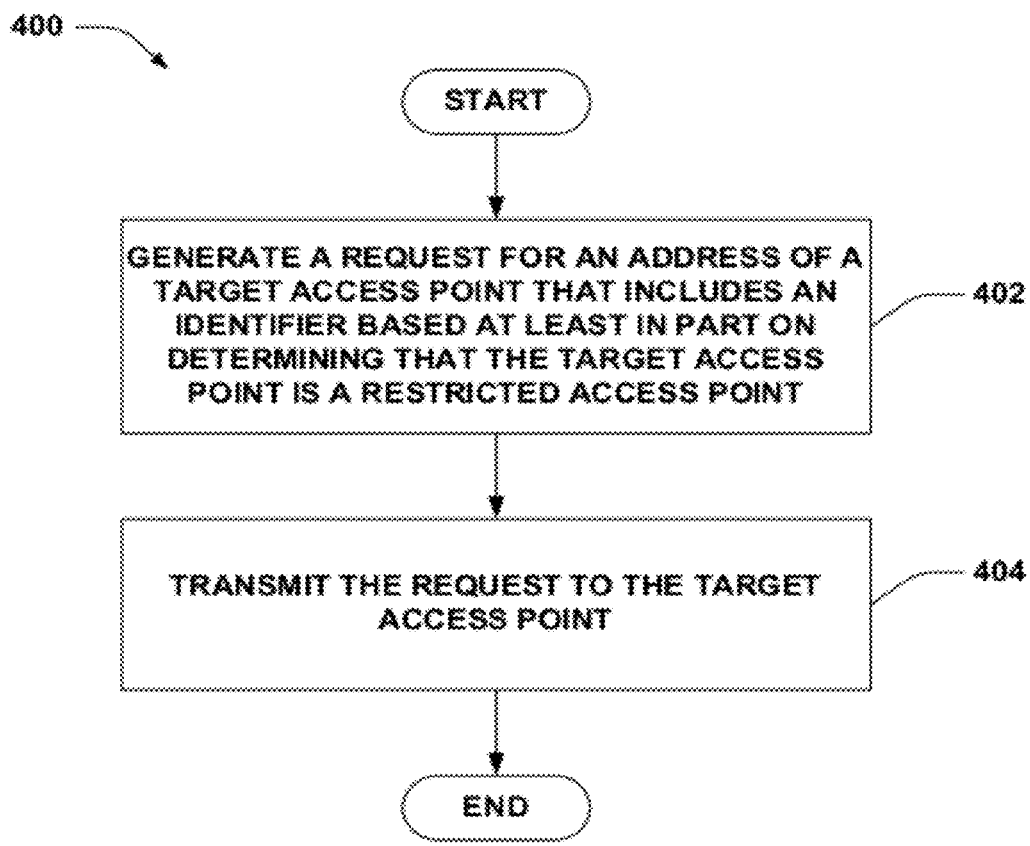
FIG. 4 is a flow chart of an aspect of a methodology for requesting information regarding a target access point.

Referring to FIG. 4, an example methodology 400 is displayed that facilitates requesting address information for an access point. At 402, a request for an address of a target access point can be generated that includes an identifier based at least in part on determining that the target access point is a restricted access point. As described, for example, the target access point can be discovered via one or more neighbor detection procedures, and additional information can be requested (e.g., using ANR in LTE). In an example, it can be determined that the target access point is a restricted access point, such as an H(e)NB or similar access point that associates with a CSG. This can be determined, for example, from the neighbor detection procedure (e.g., based on determining a CSG or other identifier advertised by or otherwise associated with the target access point). At 404, the request can be transmitted to the target access point. As described, for example, the identifier can be a CSG identifier that the target access point can utilize to determine whether it communicates in a same enterprise network for selecting a network address to return based on the request.

Figure 5:
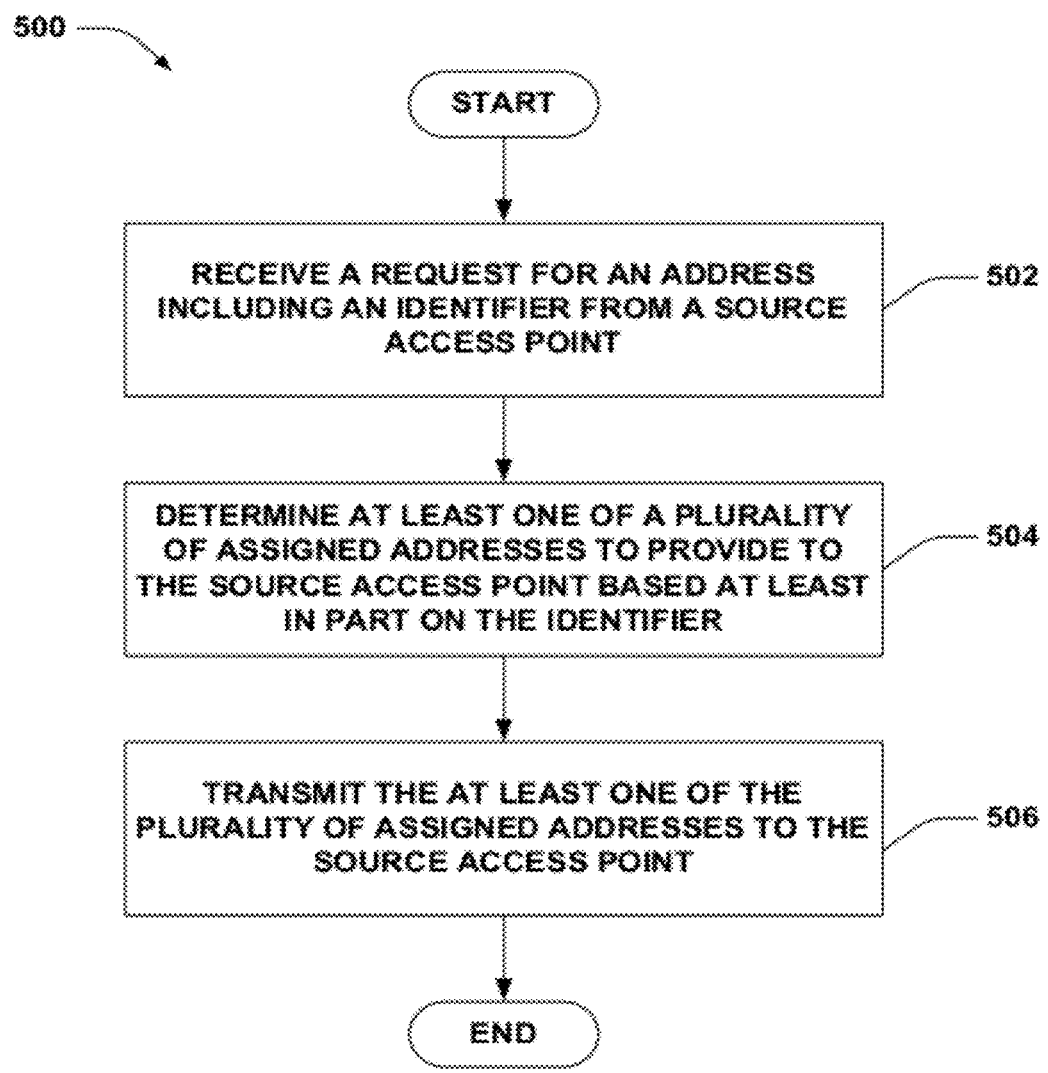
FIG. 5 is a flow chart of an aspect of a methodology that provides an address to a source access point.

Turning to FIG. 5, an example methodology 500 for selecting an address to provide to a source access point is illustrated. At 502, a request for an address can be received including an identifier from a source access point. As described, the identifier can be an identifier of the source access point (e.g., a physical cell identifier), a CSG identifier associated with the source access point, and/or the like. For example, a physical cell identifier can be used to determine whether the source access point is a macrocell access point (e.g., where the physical cell identifier is within a range of identifiers reserved for macrocell access points). At 504, at least one of a plurality of assigned addresses can be determined to provide to the source access point based at least in part on the identifier. For example, where the identifier is a physical cell identifier, it can be determined that the source access point is a macrocell access point, and thus a wireless operator network address can be determined for providing to the source access point. In another example, where the identifier is a CSG identifier, it can be compared to an advertised CSG identifier to determine whether the source access point operates in the same CSG (and thus, in one example, a same enterprise network). If so, a local network address can be determined for providing to the source access point, as described. At 506, the at least one of the plurality of assigned addresses can be transmitted to the source access point.

Figure 6:
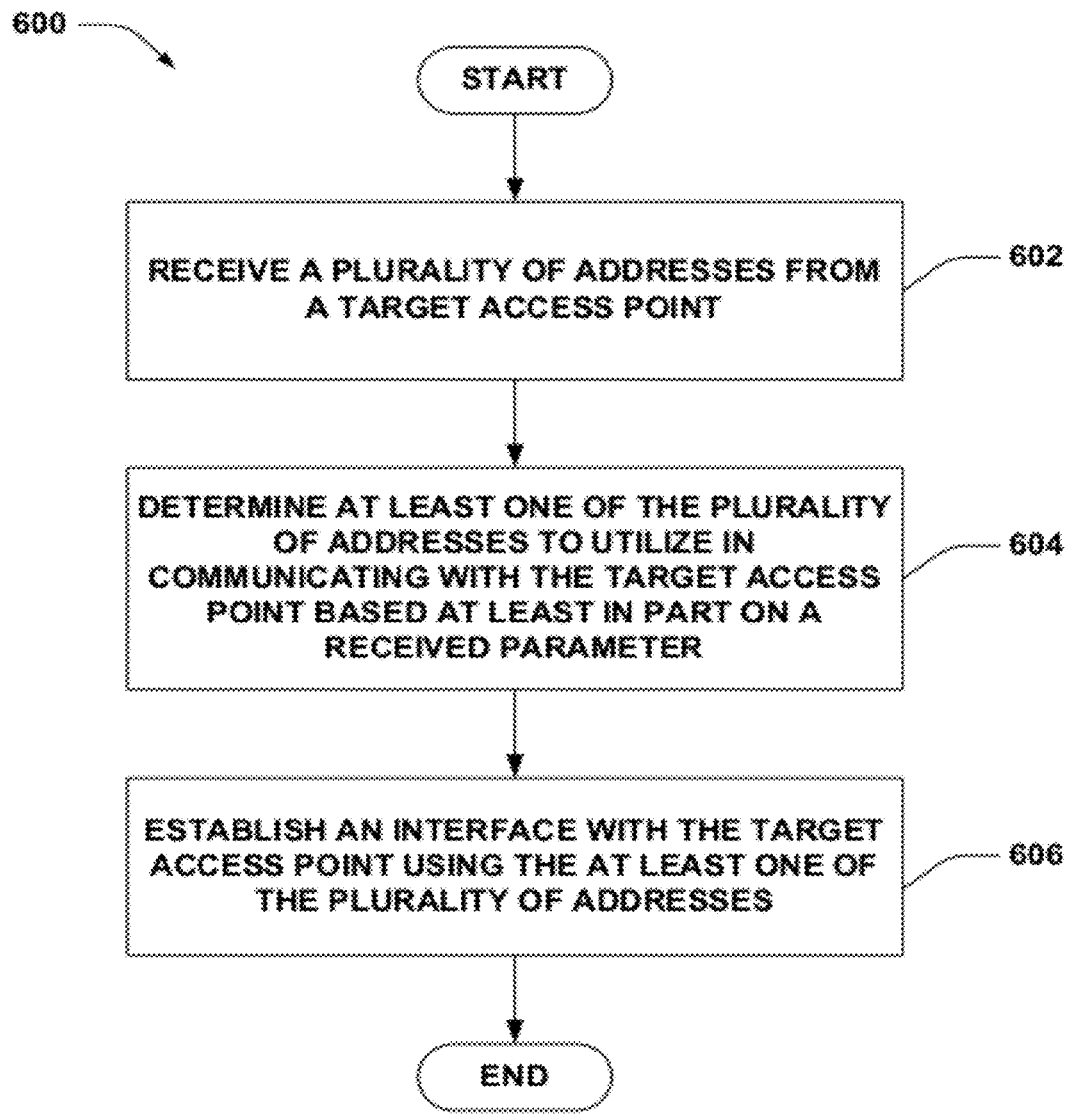
FIG. 6 is a flow chart of an aspect of a methodology for establishing an interface with a target access point using one of multiple received addresses.

Referring to FIG. 6, an example methodology 600 is shown for utilizing one of multiple addresses received from a target access point for establishing an interface therewith. At 602, a plurality of addresses can be received from the target access point. In an example, the plurality of addresses can include a local network address, a wireless operator network address, etc., and/or can include labels indicating the type of address. At 604, at least one of the plurality of addresses to utilize in communicating with the target access point can be determined based at least in part on a received parameter. As described, in an example, the received parameter can correspond to a CSG identifier or other indication that can be associated with an enterprise or a related enterprise network. Thus, for example, where the CSG identifier matches a CSG identifier utilized for restricting access of one or more devices, a local address of the plurality of addresses can be determined; otherwise, a wireless operator network address can be determined. At 606, an interface can be established with the target access point using the at least one of the plurality of addresses. As described, the interface can be an X2 or similar backhaul interface with the target access point.

Figure 7:
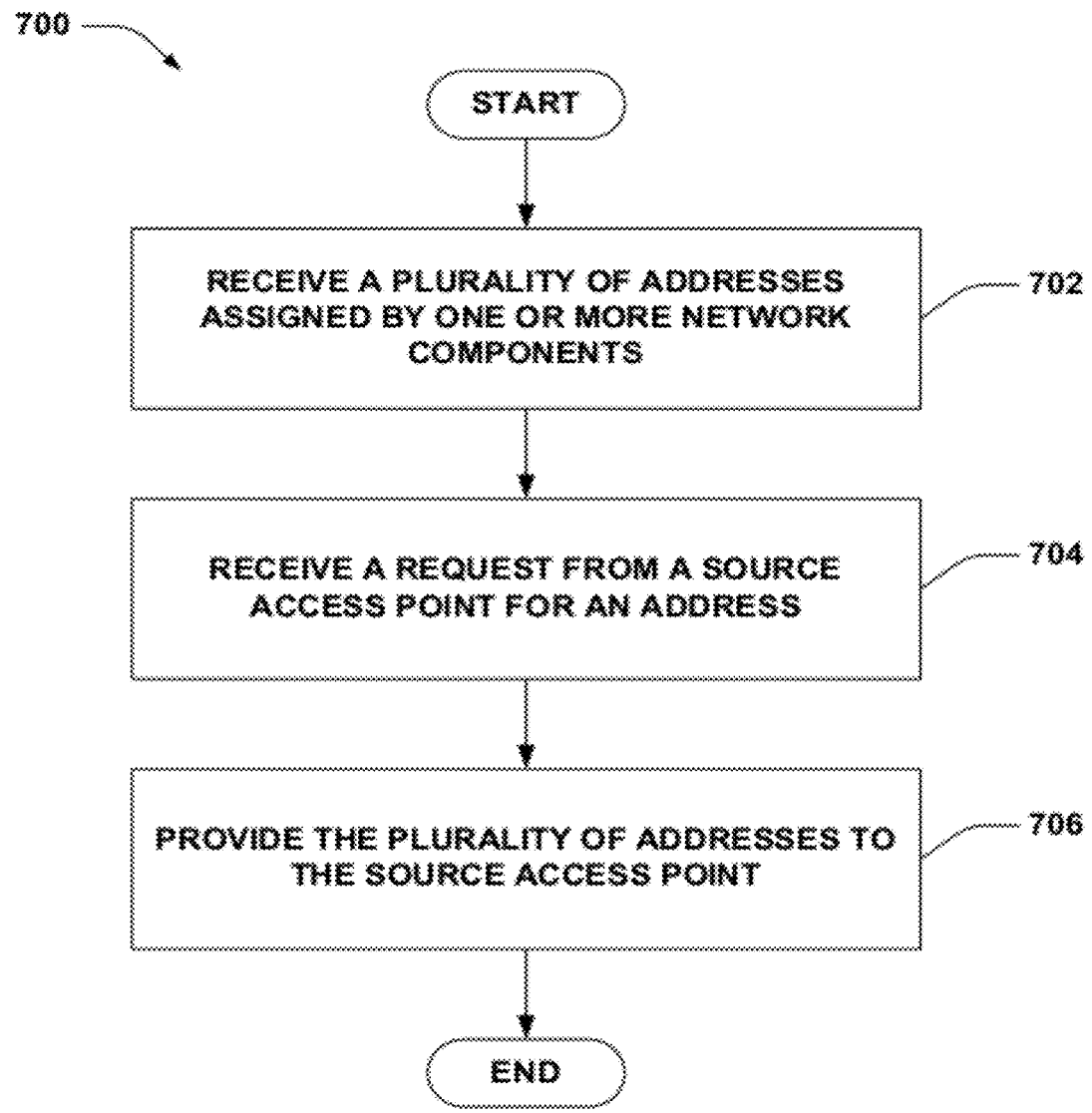
FIG. 7 is a flow chart of an aspect of a methodology for providing a plurality of addresses to a source access point.

Turning to FIG. 7, an example methodology 700 is illustrated for providing a plurality of network addresses to an access point. At 702, a plurality of addresses assigned to one or more network components can be received. For example, an address can be assigned by a component of an enterprise network, another address by a component of a wireless operator network accessed through the enterprise network, etc. At 704, a request for an address can be received from a source access point. As described, for example, the request can relate to obtaining an address for establishing an interface, as part of ANR or a request to an OAM server, etc. At 706, the plurality of addresses can be provided to the source access point.

It will be appreciated that, in accordance with one or more aspects described herein, inferences can be made regarding determining an address to provide to a source access point, determining an address to utilize in establishing an interface with a target access point, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
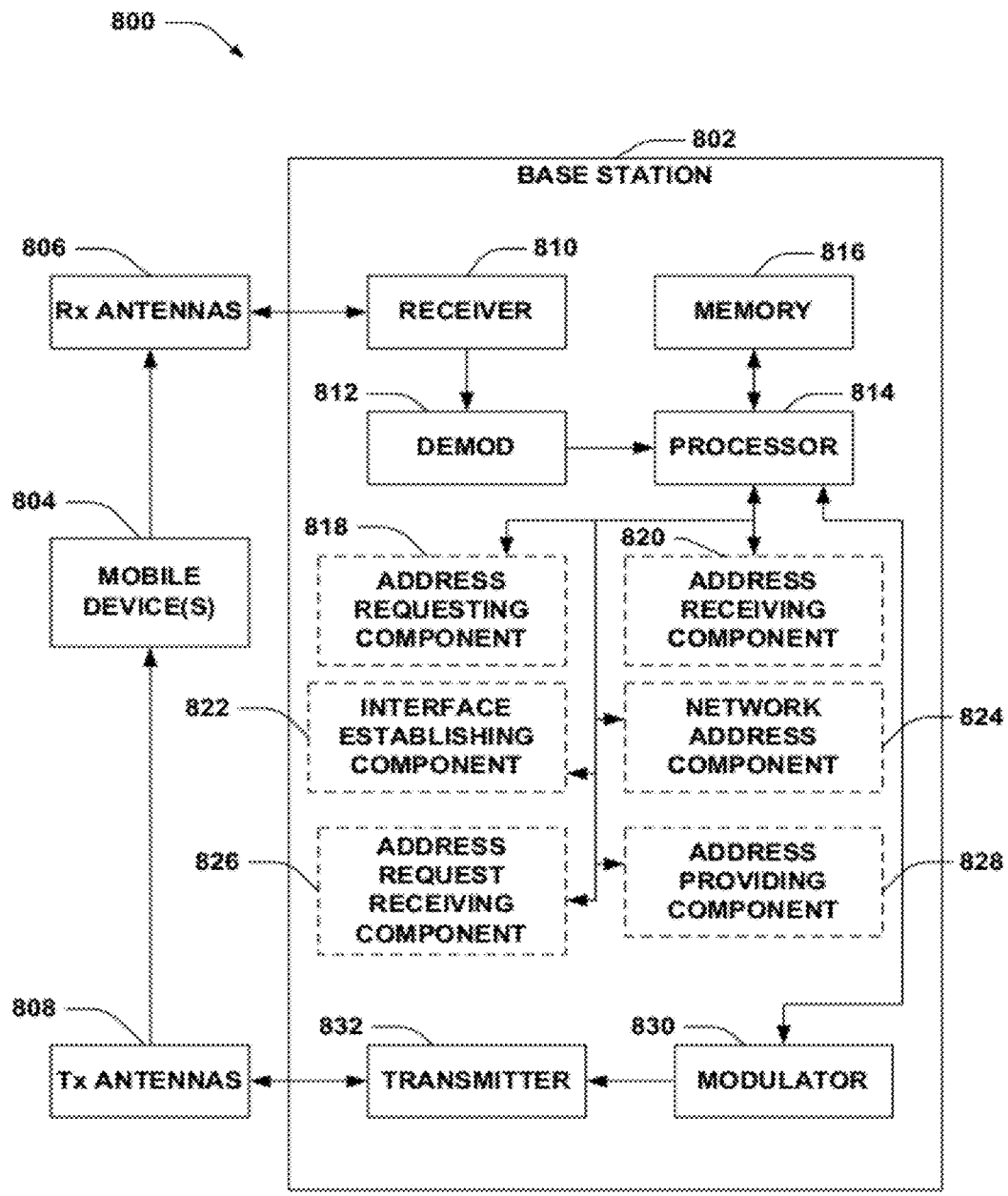
FIG. 8 is a block diagram of an aspect of a system for establishing an interface with an access point.

FIG. 8 is an illustration of a system 800 that facilitates communicating with one or more devices using wireless communications. System 800 comprises a base station 802, which can be substantially any base station (e.g., a small base station, such as a femtocell, picocell, etc., mobile base station . . . ), a relay, etc., having a receiver 810 that receives signal(s) from one or more mobile devices 804 through a plurality of receive antennas 806 (e.g., which can be of multiple network technologies, as described), and a transmitter 832 that transmits to the one or more mobile devices 804 through a plurality of transmit antennas 808 (e.g., which can be of multiple network technologies, as described). In addition, in one example, transmitter 832 can transmit to the mobile devices 804 over a wired front link. Receiver 810 can receive information from one or more receive antennas 806 and is operatively associated with a demodulator 812 that demodulates received information. In addition, in an example, receiver 810 can receive from a wired backhaul link. Demodulated symbols are analyzed by a processor 814. Processor 814 can be a processor dedicated to analyzing information received by receiver 810 and/or generating information for transmission by a transmitter 832, a processor that controls one or more components of base station 802, and/or a processor that both analyzes information received by receiver 810, generates information for transmission by transmitter 832, and controls one or more components of base station 802.

Base station 802 can additionally comprise memory 816 that is operatively coupled to processor 814 and that can store data to be transmitted, received data, information related to available channels, data associated with analyzed signal and/or interference strength, information related to an assigned channel, power, rate, or the like, and any other suitable information for various aspects described herein (e.g., CSG membership information, etc.). Memory 816 can additionally store protocols and/or algorithms associated with aspects described herein (e.g., performing intra-CSG handover, etc.).

It will be appreciated that memory 816, which can be a data store for example, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 816 of the subject systems and methods is intended to comprise, without being limited to, these and any other suitable types of memory.

Processor 814 is further optionally coupled to an address requesting component 818, which can be similar to address requesting component 210, an address receiving component 820, which can be similar to address receiving component 212, an interface establishing component 822, which can be similar to interface establishing components 214 and/or 222, a network address component 824, which can be similar to network address component 216, an address request receiving component 826, which can be similar to address request receiving component 218, and/or an address providing component 828, which can be similar to address providing component 220.

Moreover, for example, processor 814 can modulate signals to be transmitted using modulator 830, and transmit modulated signals using transmitter 832. Transmitter 832 can transmit signals to mobile devices 804 over Tx antennas 808. Furthermore, although depicted as being separate from the processor 814, it is to be appreciated that the address requesting component 818, address receiving component 820, interface establishing component 822, network address component 824, address request receiving component 826, address providing component 828, demodulator 812, and/or modulator 830 can be part of the processor 814 or multiple processors (not shown), and/or stored as instructions in memory 816 for execution by processor 814.

Figure 9:
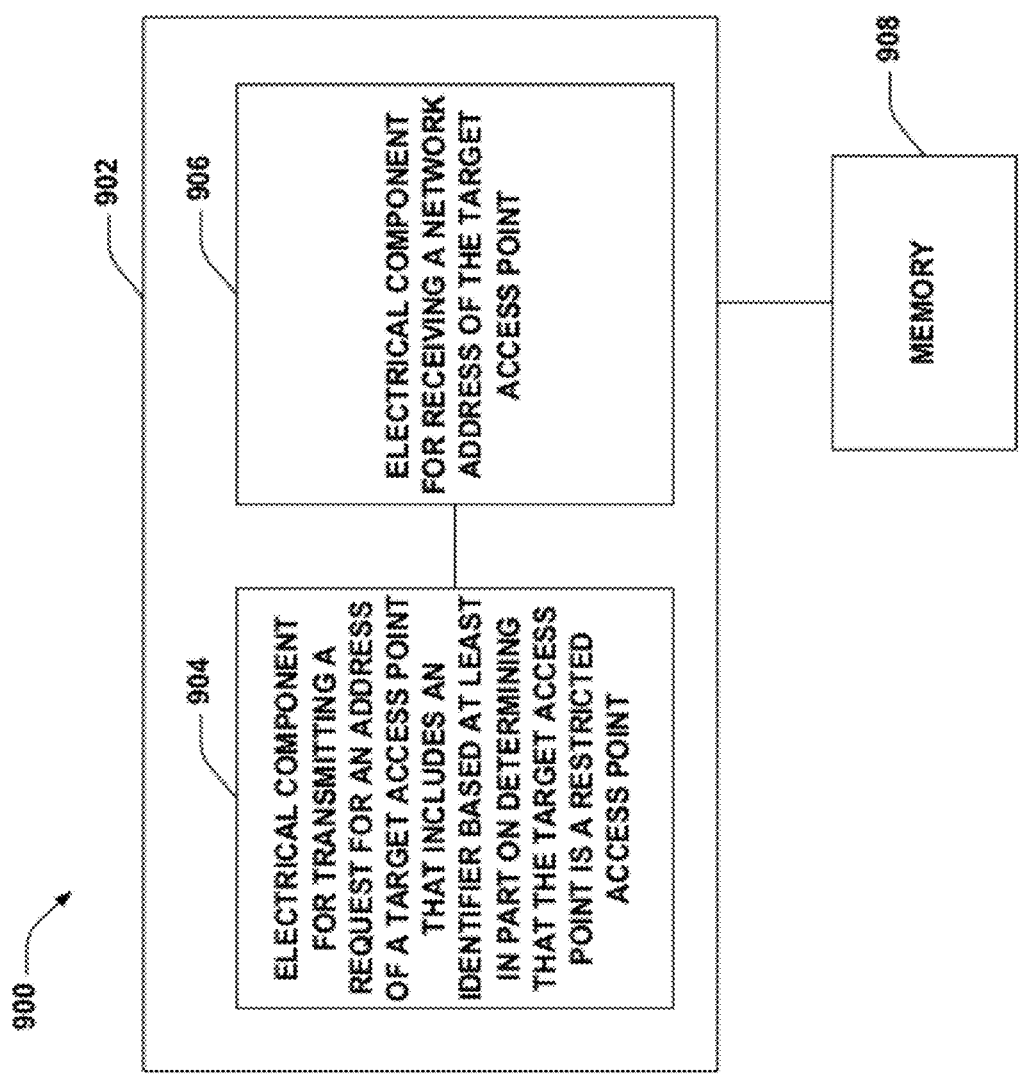
FIG. 9 is a block diagram of an aspect of a system that requests information regarding a target access point.

With reference to FIG. 9, illustrated is a system 900 that requests access point information for establishing an interface therewith. For example, system 900 can reside at least partially within a base station, device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for transmitting a request for an address of a target access point that includes an identifier based at least in part on determining that the target access point is a restricted access point 904. As described, the identifier can include an identifier of system 900, a CSG identifier advertised by system 900, and/or the like. Further, logical grouping 902 can comprise an electrical component for receiving a network address of the target access point 906. For example, the network address can be used to establish an interface with the target access point, as described.

For example, electrical component 904 can include an address requesting component 210, as described above. In addition, for example, electrical component 906, in an aspect, can include an address receiving component 212, as described above. Additionally, system 900 can include a memory 908 that retains instructions for executing functions associated with the electrical components 904 and 906. While shown as being external to memory 908, it is to be understood that one or more of the electrical components 904 and 906 can exist within memory 908. In one example, electrical components 904 and 906 can comprise at least one processor, or each electrical component 904 and 906 can be a corresponding module of at least one processor. Moreover, in an additional or alternative example, electrical components 904 and 906 can be a computer program product comprising a computer readable medium, where each electrical component 904 and 906 can be corresponding code.

Figure 10:
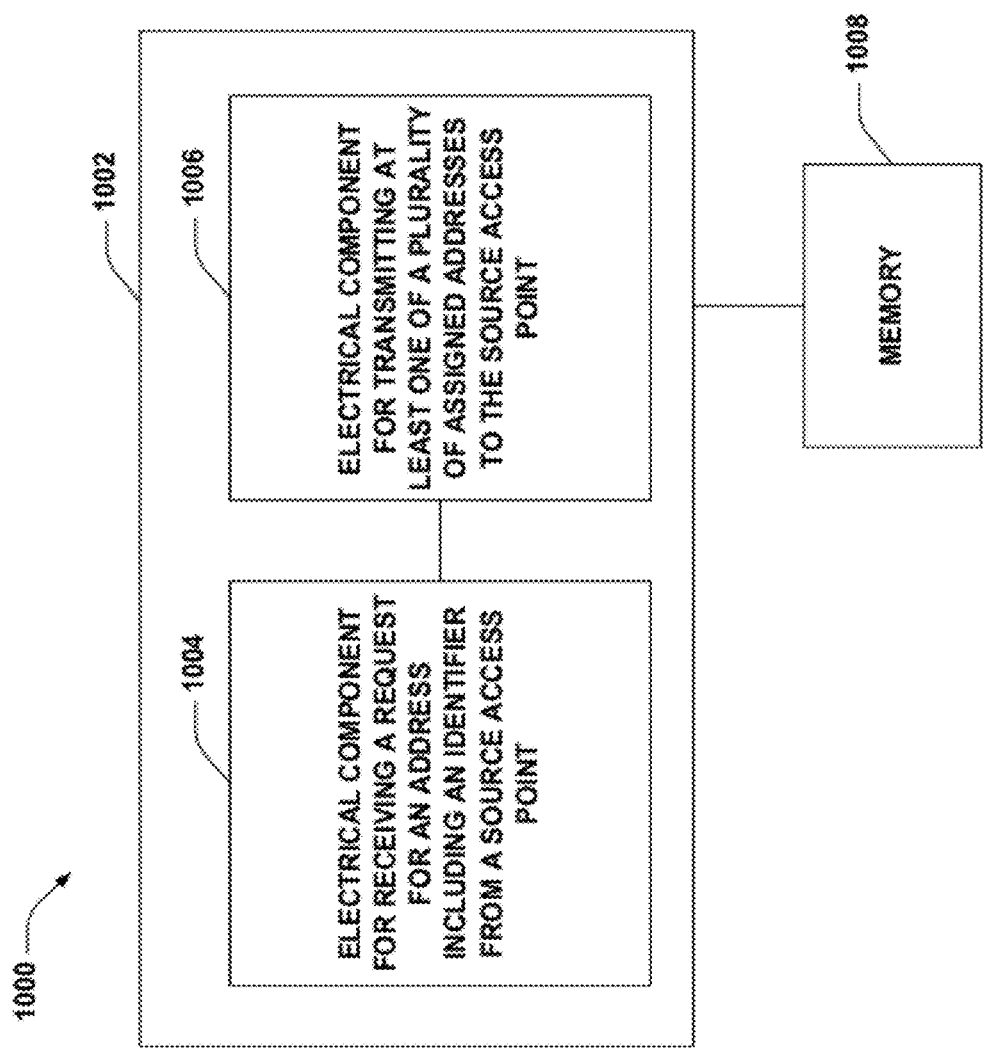
FIG. 10 is a block diagram of an aspect of a system that provides an address to a source access point.

With reference to FIG. 10, illustrated is a system 1000 that provides access point address information to a source access point. For example, system 1000 can reside at least partially within a base station, device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a request for an address including an identifier from a source access point 1004. As described, the identifier can include an identifier of the source access point, a CSG identifier advertised by the source access point, and/or the like. Further, logical grouping 1002 can comprise an electrical component for transmitting at least one of a plurality of assigned addresses to the source access point 1006. For example, the network address can be determined based at least in part on the identifier received from the source access point, as described.

For example, electrical component 1004 can include an address request receiving component 218, as described above. In addition, for example, electrical component 1006, in an aspect, can include an address providing component 220, as described above. Additionally, system 1000 can include a memory 1008 that retains instructions for executing functions associated with the electrical components 1004 and 1006. While shown as being external to memory 1008, it is to be understood that one or more of the electrical components 1004 and 1006 can exist within memory 1008. In one example, electrical components 1004 and 1006 can comprise at least one processor, or each electrical component 1004 and 1006 can be a corresponding module of at least one processor. Moreover, in an additional or alternative example, electrical components 1004 and 1006 can be a computer program product comprising a computer readable medium, where each electrical component 1004 and 1006 can be corresponding code.

Figure 11:
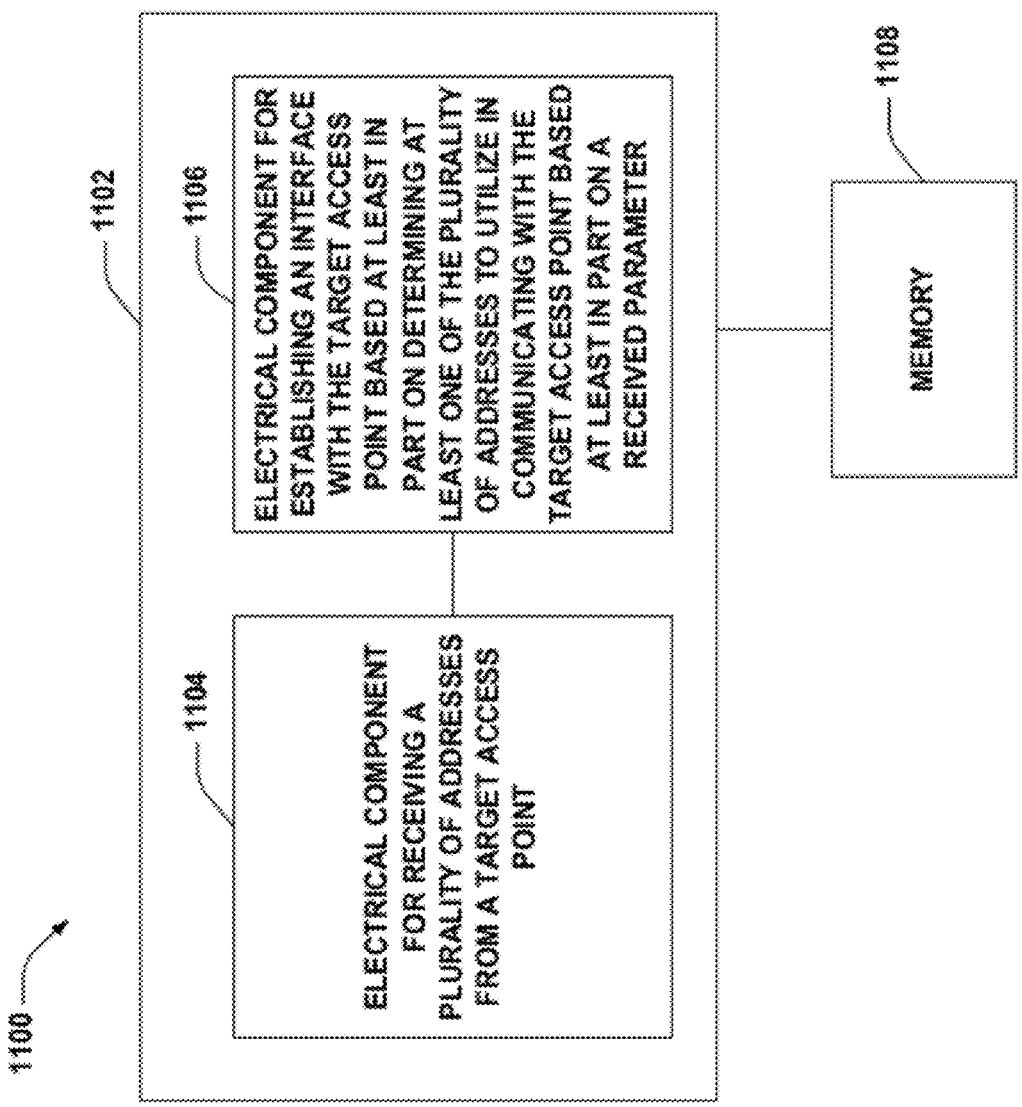
FIG. 11 is a block diagram of an aspect of a system that establishes an interface with a target access point using one of multiple received addresses.

With reference to FIG. 11, illustrated is a system 1100 that establishes an interface with an access point using one of a plurality of received addresses. For example, system 1100 can reside at least partially within a base station, device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving a plurality of addresses from a target access point 1104. As described, this can be part of an ANR or similar procedure to receive access point information based on detecting presence of the target access point. Further, logical grouping 1102 can comprise an electrical component for establishing an interface with the target access point based at least in part on determining at least one of the plurality of addresses to utilize in communicating with the target access point based at least in part on a received identifier 1106. For example, the address to utilize can be determined based at least in part on one or more labels included with the addresses, the identifier received from the target access point in the received addresses, and/or the like, as described.

For example, electrical component 1104 can include an address receiving component 212, as described above. In addition, for example, electrical component 1106, in an aspect, can include an interface establishing component 214, as described above. Additionally, system 1100 can include a memory 1108 that retains instructions for executing functions associated with the electrical components 1104 and 1106. While shown as being external to memory 1108, it is to be understood that one or more of the electrical components 1104 and 1106 can exist within memory 1108. In one example, electrical components 1104 and 1106 can comprise at least one processor, or each electrical component 1104 and 1106 can be a corresponding module of at least one processor. Moreover, in an additional or alternative example, electrical components 1104 and 1106 can be a computer program product comprising a computer readable medium, where each electrical component 1104 and 1106 can be corresponding code.

Figure 12:
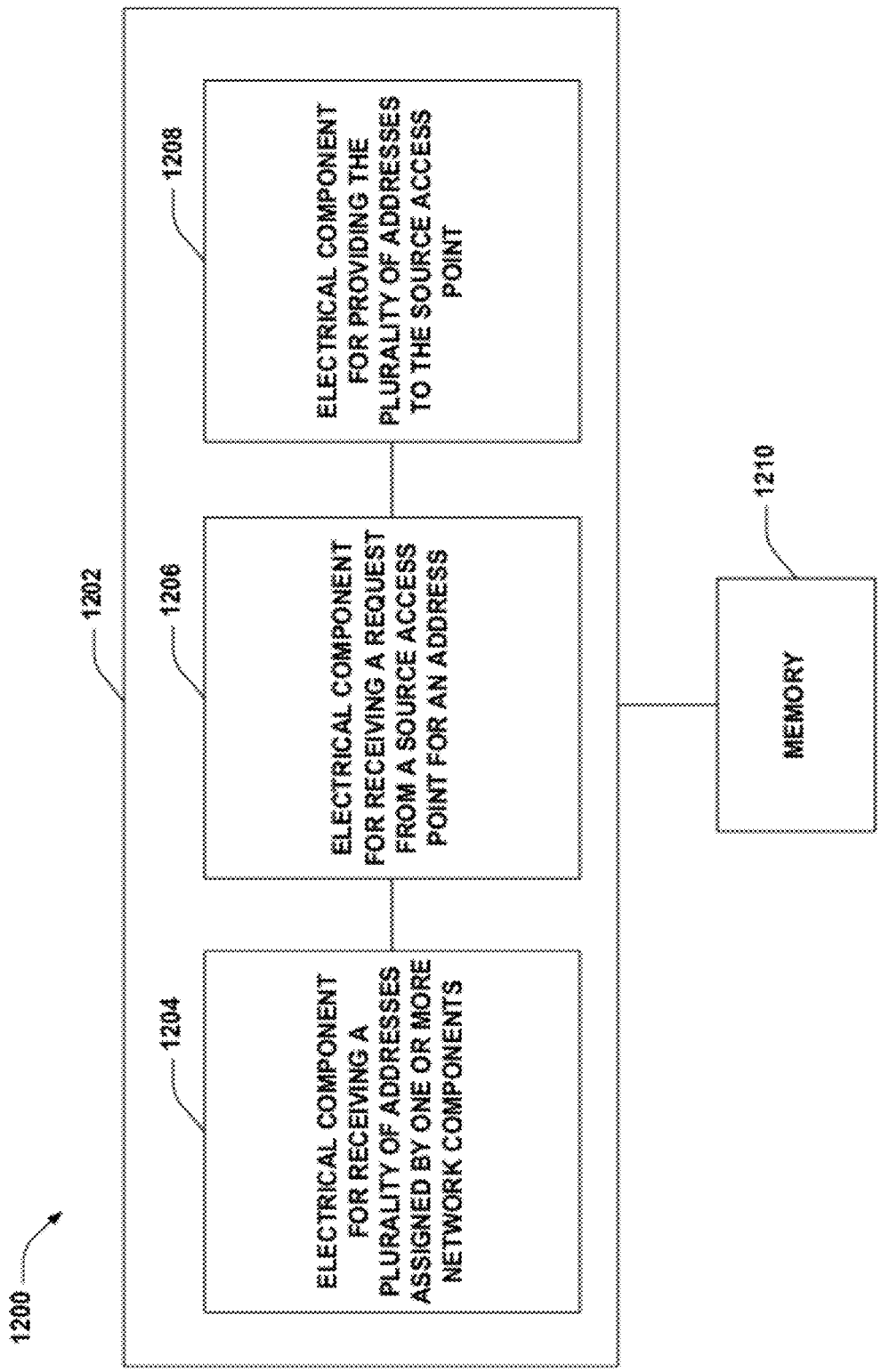
FIG. 12 is a block diagram of an aspect of a system that provides a plurality of addresses to a source access point.

With reference to FIG. 12, illustrated is a system 1200 that provides a plurality of addresses to a source access point. For example, system 1200 can reside at least partially within a base station, device, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for receiving a plurality of addresses assigned by one or more network components 1204. As described, the addresses can include a local network address received from an enterprise network, a wireless operator network address received from a wireless operator network, etc. Further, logical grouping 1202 can comprise an electrical component for receiving a request from a source access point for an address

1206. For example, the network address can be used to establish an interface with the target access point, as described.

In an example, the request can be part of an ANR or similar procedure following detecting presence of system 1200. Additionally, logical grouping 1202 can comprise an electrical component for providing the plurality of addresses to the source access point 1208. In addition, in one example, labels identifying address type can be provided to the source access point, as described. For example, electrical component 1204 can include a network address component 216, as described above. In addition, for example, electrical component 1206, in an aspect, can include an address request receiving component 218, as described above. Moreover, in an example, electrical component 1208 can include an address providing component 220, as described above. Additionally, system 1200 can include a memory 1210 that retains instructions for executing functions associated with the electrical components 1204, 1206 and 1208. While shown as being external to memory 1210, it is to be understood that one or more of the electrical components 1204, 1206 and 1208 can exist within memory 1210.

In one example, electrical components 1204, 1206 and 1208 can comprise at least one processor, or each electrical component 1204, 1206 and 1208 can be a corresponding module of at least one processor. Moreover, in an additional or alternative example, electrical components 1204, 1206 and 1208 can be a computer program product comprising a computer readable medium, where each electrical component 1204, 1206 and 1208 can be corresponding code.

Figure 13:
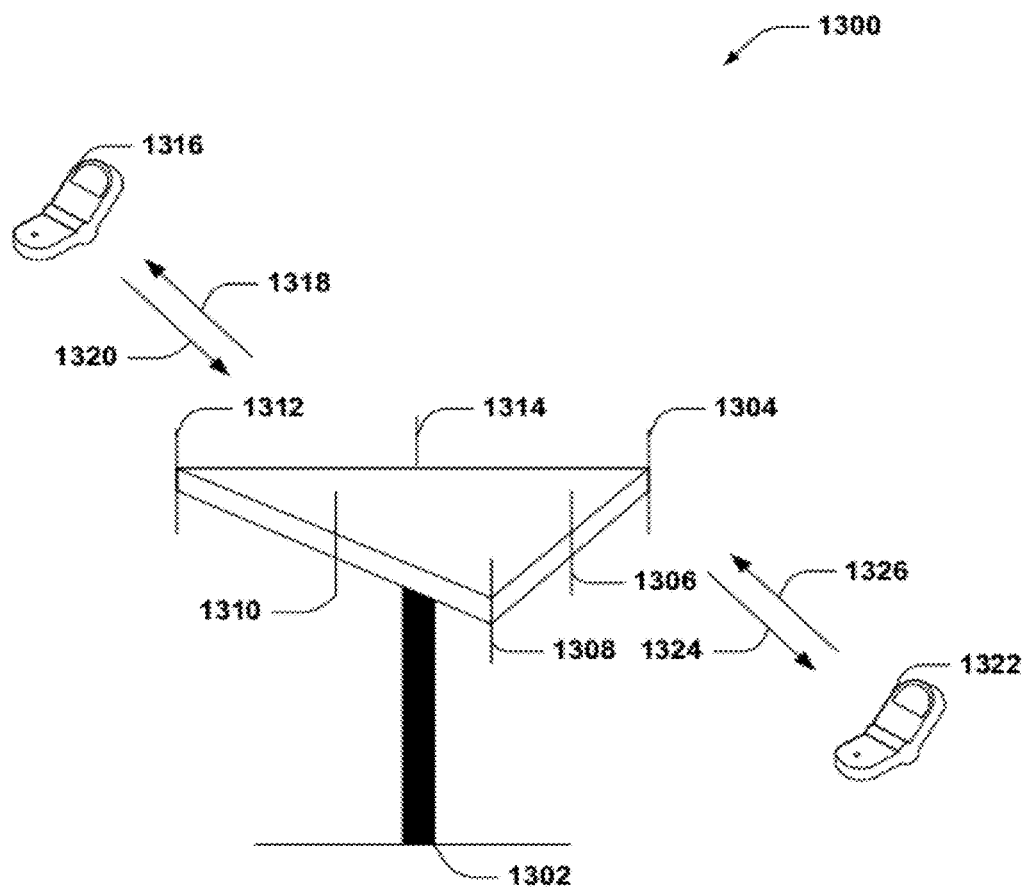
FIG. 13 is a block diagram of an aspect of a wireless communication system in accordance with various aspects set forth herein.

Referring now to FIG. 13, a wireless communication system 1300 is illustrated in accordance with various embodiments presented herein. System 1300 comprises a base station 1302 that can include multiple antenna groups. For example, one antenna group can include antennas 1304 and 1306, another group can comprise antennas 1308 and 1310, and an additional group can include antennas 1312 and 1314. Two antennas are illustrated for each antenna group; however, more or fewer antennas can be utilized for each group. Base station 1302 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1302 can communicate with one or more mobile devices such as mobile device 1316 and mobile device 1322; however, it is to be appreciated that base station 1302 can communicate with substantially any number of mobile devices similar to mobile devices 1316 and 1322. Mobile devices 1316 and 1322 can be, for example, cellular phones, smart phones, laptops, handheld communication devices, handheld computing devices, satellite radios, global positioning systems, PDAs, and/or any other suitable device for communicating over wireless communication system 1300. As depicted, mobile device 1316 is in communication with antennas 1312 and 1314, where antennas 1312 and 1314 transmit information to mobile device 1316 over a forward link 1318 and receive information from mobile device 1316 over a reverse link 1320. Moreover, mobile device 1322 is in communication with antennas 1304 and 1306, where antennas 1304 and 1306 transmit information to mobile device 1322 over a forward link 1324 and receive information from mobile device 1322 over a reverse link 1326. In a frequency division duplex (FDD) system, forward link 1318 can utilize a different frequency band than that used by reverse link 1320, and forward link 1324 can employ a different frequency band than that employed by reverse link 1326, for example. Further, in a time division duplex (TDD) system, forward link 1318 and reverse link 1320 can utilize a common frequency band and forward link 1324 and reverse link 1326 can utilize a common frequency band.

Each group of antennas and/or the area in which they are designated to communicate can be referred to as a sector of base station 1302. For example, antenna groups can be designed to communicate to mobile devices in a sector of the areas covered by base station 1302. In communication over forward links 1318 and 1324, the transmitting antennas of base station 1302 can utilize beamforming to improve signal-to-noise ratio of forward links 1318 and 1324 for mobile devices 1316 and 1322. Also, while base station 1302 utilizes beamforming to transmit to mobile devices 1316 and 1322 scattered randomly through an associated coverage, mobile devices in neighboring cells can be subject to less interference as compared to a base station transmitting through a single antenna to all its mobile devices. Moreover, mobile devices 1316 and 1322 can communicate directly with one another using a peer-to-peer or ad hoc technology as depicted. According to an example, system 1300 can be a multiple-input multiple-output (MIMO) communication system.

Figure 14:
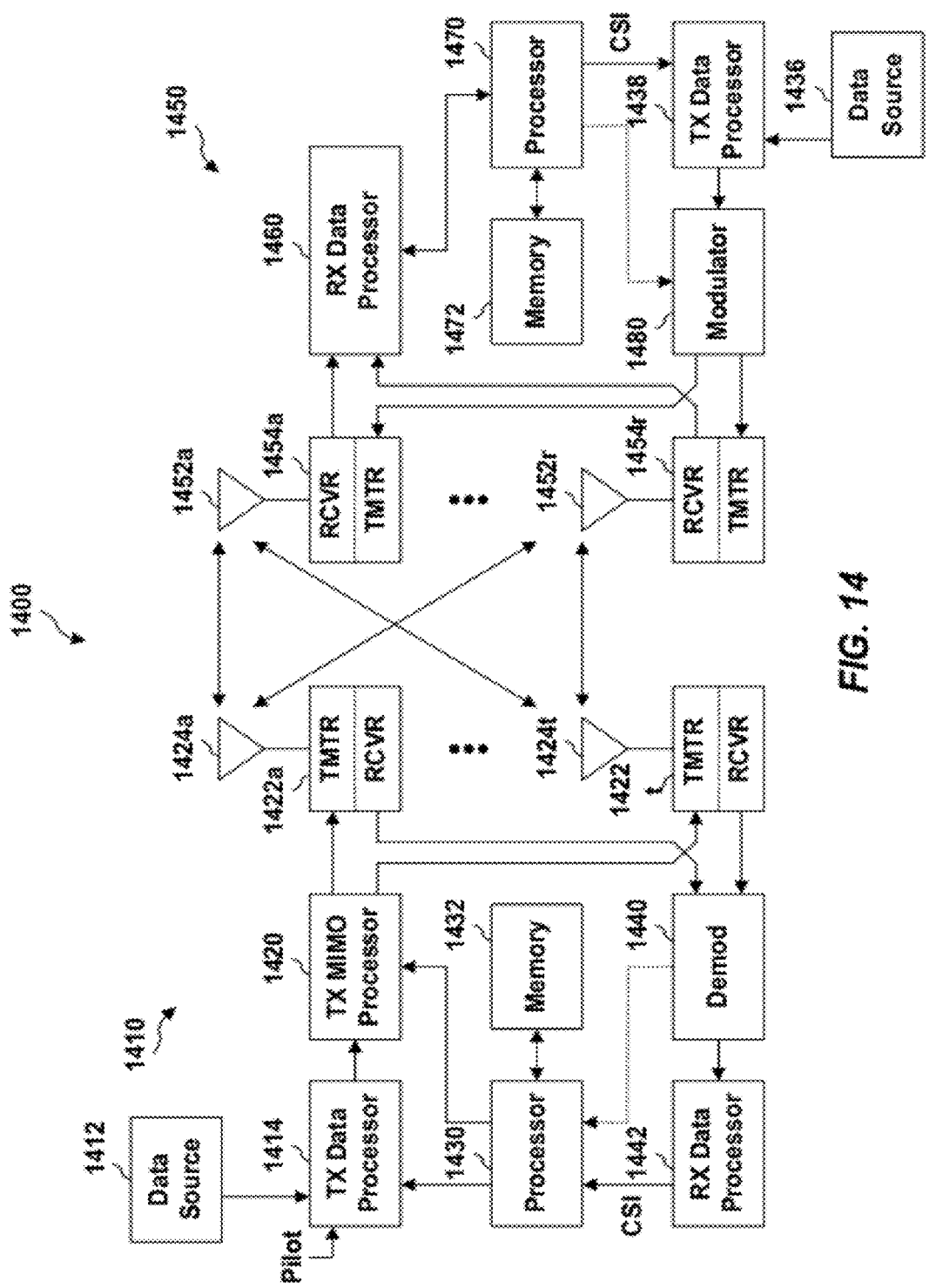
FIG. 14 is a schematic block diagram of an aspect of a wireless network environment that can be employed in conjunction with the various systems and methods described herein.

FIG. 14 shows an example wireless communication system 1400. The wireless communication system 1400 depicts one base station 1410 and one mobile device 1450 for sake of brevity. However, it is to be appreciated that system 1400 can include more than one base station and/or more than one mobile device, wherein additional base stations and/or mobile devices can be substantially similar or different from example base station 1410 and mobile device 1450 described below. In addition, it is to be appreciated that base station 1410 and/or mobile device 1450 can employ the systems (FIGS. 1-3 and 8-13) and methods (FIGS. 4-7) described herein to facilitate wireless communication there between. For example, components or functions of the systems and/or methods described herein can be part of a memory 1432 and/or 1472 or processors 1430 and/or 1470 described below, and/or can be executed by processors 1430 and/or 1470 to perform the disclosed functions.

At base station 1410, traffic data for a number of data streams is provided from a data source 1412 to a transmit (TX) data processor 1414. According to an example, each data stream can be transmitted over a respective antenna. TX data processor 1414 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1450 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1430.

The modulation symbols for the data streams can be provided to a TX MIMO processor 1420, which can further process the modulation symbols (e.g., for OFDM). TX MIMO processor 1420 then provides $N_T$ modulation symbol streams to $N_T$ transmitters (TMTR) 1422a through 1422t. In various embodiments, TX MIMO processor 1420 applies beamforming weights to the symbols of the data streams and to the antenna from which the symbol is being transmitted.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1422a through 1422t are transmitted from $N_T$ antennas 1424a through 1424t, respectively.

At mobile device 1450, the transmitted modulated signals are received by $N_R$ antennas 1452a through 1452r and the received signal from each antenna 1452 is provided to a respective receiver (RCVR) 1454a through 1454r. Each receiver 1454 conditions (e.g., filters, amplifies, and down-converts) a respective signal, digitizes the conditioned signal to provide samples, and further processes the samples to provide a corresponding "received" symbol stream.

An RX data processor 1460 can receive and process the $N_R$ received symbol streams from $N_R$ receivers 1454 based on a particular receiver processing technique to provide $N_T$ "detected" symbol streams. RX data processor 1460 can demodulate, deinterleave, and decode each detected symbol stream to recover the traffic data for the data stream. The processing by RX data processor 1460 is complementary to that performed by TX MIMO processor 1420 and TX data processor 1414 at base station 1410.

The reverse link message can comprise various types of information regarding the communication link and/or the received data stream. The reverse link message can be processed by a TX data processor 1438, which also receives traffic data for a number of data streams from a data source 1436, modulated by a modulator 1480, conditioned by transmitters 1454a through 1454r, and transmitted back to base station 1410.

At base station 1410, the modulated signals from mobile device 1450 are received by antennas 1424, conditioned by receivers 1422, demodulated by a demodulator 1440, and processed by a RX data processor 1442 to extract the reverse link message transmitted by mobile device 1450. Further, processor 1430 can process the extracted message to determine which precoding matrix to use for determining the beamforming weights.

Processors 1430 and 1470 can direct (e.g., control, coordinate, manage, etc.) operation at base station 1410 and mobile device 1450, respectively. Respective processors 1430 and 1470 can be associated with memory 1432 and 1472 that store program codes and data. Processors 1430 and 1470 can also perform computations to derive frequency and impulse response estimates for the uplink and downlink, respectively.

Figure 15:
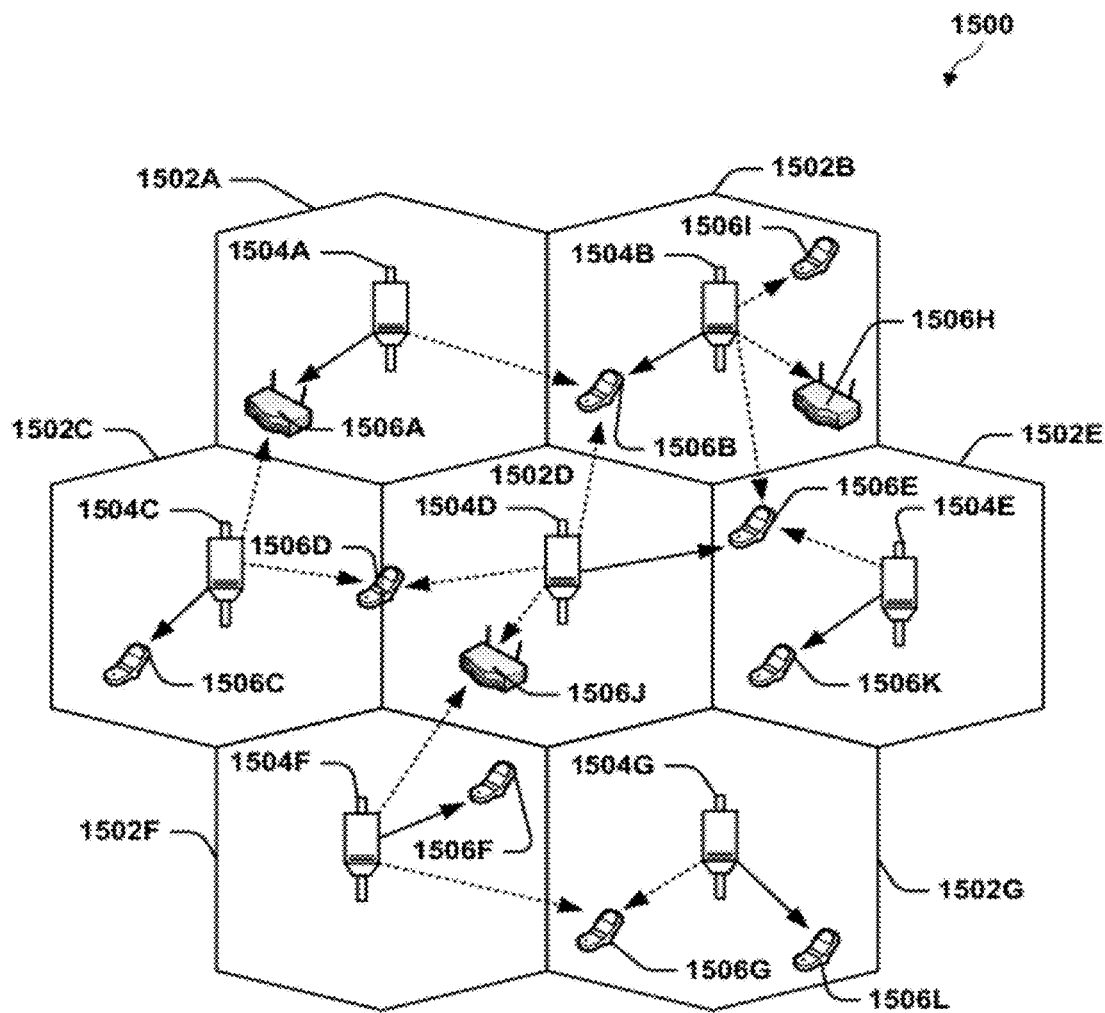
FIG. 15 a schematic diagram of an aspect of a wireless communication system, configured to support a number of devices, in which the aspects herein can be implemented.

FIG. 15 illustrates a wireless communication system 1500, configured to support a number of users, in which the teachings herein may be implemented. The system 1500 provides communication for multiple cells 1502, such as, for example, macro cells 1502A-1502G, with each cell being serviced by a corresponding access node 1504 (e.g., access nodes 1504A-1504G). As shown in FIG. 15, access terminals 1506 (e.g., access terminals 1506A-1506L) can be dispersed at various locations throughout the system over time. Each access terminal 1506 can communicate with one or more access nodes 1504 on a forward link (FL) and/or a reverse link (RL) at a given moment, depending upon whether the access terminal 1506 is active and whether it is in soft handoff, for example. The wireless communication system 1500 can provide service over a large geographic region.

Figure 16:
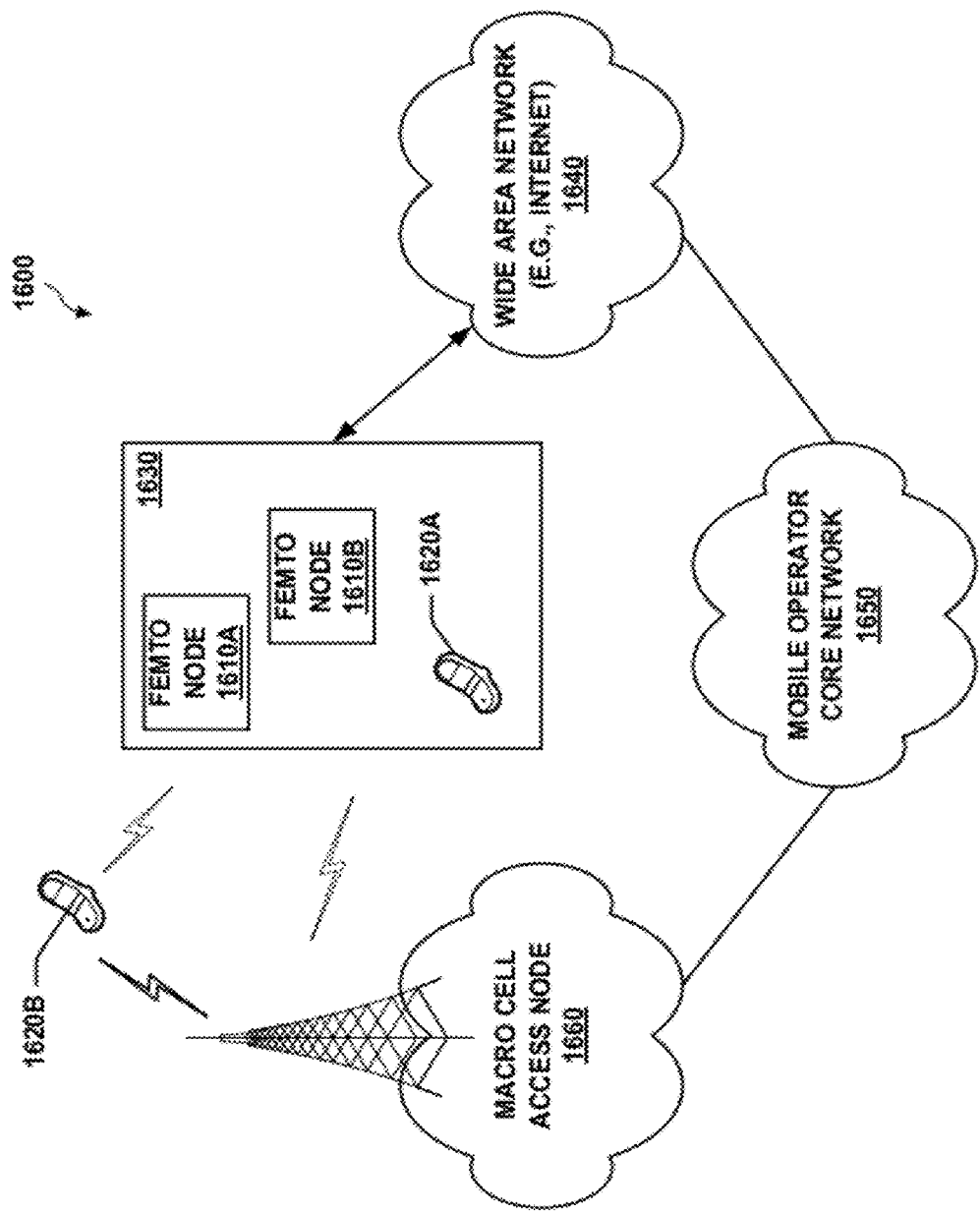
FIG. 16 is a schematic diagram of an aspect of a communication system to enable deployment of femtocells within a network environment.

FIG. 16 illustrates an exemplary communication system 1600 where one or more femto nodes are deployed within a network environment. Specifically, the system 1600 includes multiple femto nodes 1610A and 1610B (e.g., femtocell nodes or H(e)NB) installed in a relatively small scale network environment (e.g., in one or more user residences 1630). Each femto node 1610 can be coupled to a wide area network 1640 (e.g., the Internet) and a mobile operator core network 1650 via a digital subscriber line (DSL) router, a cable modem, a wireless link, or other connectivity means (not shown). As will be discussed below, each femto node 1610 can be configured to serve associated access terminals 1620 (e.g., access terminal 1620A) and, optionally, alien access terminals 1620 (e.g., access terminal 1620B). In other words, access to femto nodes 1610 can be restricted such that a given access terminal 1620 can be served by a set of designated (e.g., home) femto node(s) 1610 but may not be served by any non-designated femto nodes 1610 (e.g., a neighbor's femto node).

Figure 17:
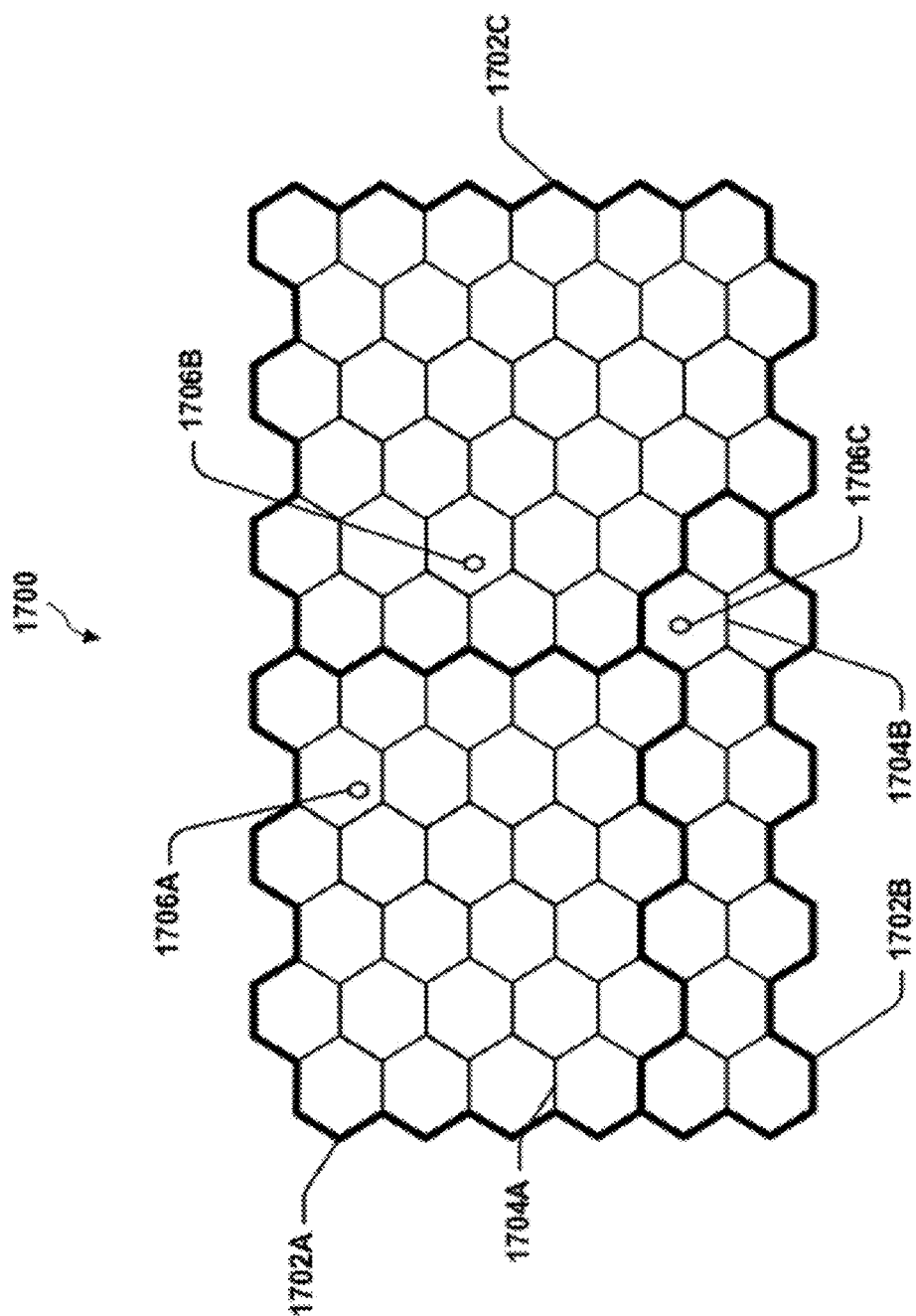
FIG. 17 is a schematic diagram of an aspect of a coverage map having several defined tracking areas.

FIG. 17 illustrates an example of a coverage map 1700 where several tracking areas 1702 (or routing areas or location areas) are defined, each of which includes several macro coverage areas 1704. Here, areas of coverage associated with tracking areas 1702A, 1702B, and 1702C are delineated by the wide lines and the macro coverage areas 1704 are represented by the hexagons. The tracking areas 1702 also include femto coverage areas 1706. In this example, each of the femto coverage areas 1706 (e.g., femto coverage area 1706C) is depicted within a macro coverage area 1704 (e.g., macro coverage area 1704B). It should be appreciated, however, that a femto coverage area 1706 may not lie entirely within a macro coverage area 1704. In practice, a large number of femto coverage areas 1706 can be defined with a given tracking area 1702 or macro coverage area 1704. Also, one or more pico coverage areas (not shown) can be defined within a given tracking area 1702 or macro coverage area 1704.

Referring again to FIG. 16, the owner of a femto node 1610 can subscribe to mobile service, such as, for example, 3G mobile service, offered through the mobile operator core network 1650. In addition, an access terminal 1620 can be capable of operating both in macro environments and in smaller scale (e.g., residential) network environments. Thus, for example, depending on the current location of the access terminal 1620, the access terminal 1620 can be served by an access node 1660 or by any one of a set of femto nodes 1610 (e.g., the femto nodes 1610A and 1610B that reside within a corresponding user residence 1630). For example, when a subscriber is outside his home, he is served by a standard macro cell access node (e.g., node 1660) and when the subscriber is at home, he is served by a femto node (e.g., node 1610A). Here, it should be appreciated that a femto node 1610 can be backward compatible with existing access terminals 1620.

A femto node 1610 can be deployed on a single frequency or, in the alternative, on multiple frequencies. Depending on the particular configuration, the single frequency or one or more of the multiple frequencies can overlap with one or more frequencies used by a macro cell access node (e.g., node 1660). In some aspects, an access terminal 1620 can be configured to connect to a preferred femto node (e.g., the home femto node of the access terminal 1620) whenever such connectivity is possible. For example, whenever the access terminal 1620 is within the user's residence 1630, it can communicate with the home femto node 1610.

In some aspects, if the access terminal 1620 operates within the mobile operator core network 1650 but is not residing on its most preferred network (e.g., as defined in a preferred roaming list), the access terminal 1620 can continue to search for the most preferred network (e.g., femto node 1610) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1620 can limit the search for specific band and channel. For example, the search for the most preferred system can be repeated periodically. Upon discovery of a preferred femto node, such as femto node 1610, the access terminal 1620 selects the femto node 1610 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1610 that reside within the corresponding user residence 1630). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communication, comprising the steps of:
   receiving, at a target access point from a source access point, a request for an address to communicate with the target access point, wherein the target access point and the source access point are not initially in direct communication and said request transmitted through at least one network between the target access point and the source access point;
   sending to the source access point a local network address of the target access point, a label for the local network address, a wireless operator network address of the target access point, and a label for the wireless operator network address;
   the source access point determining whether to establish a connection to the target access point using the local network address or the wireless operator network address based at least in part on an identifier from a measurement report wherein the identifier is a closed subscriber group (CSG) identifier of the local network or the identifier is a physical cell identifier of a macrocell access point of the wireless operator network address; and,
   establishing an interface from the source access point with the local network, the wireless operator network, or both;
   the source access point receiving a local address from the local network, the wireless operator network, or both, and thereby establishing an interface with target access point.

2. The method of claim 1, further comprising determining whether the identifier matches an advertised CSG identifier.

3. The method of claim 1, further comprising determining whether the identifier is different from an advertised CSG identifier.

4. An apparatus for providing access point information, comprising:
   at least one processor configured to perform the steps of the method of claim 1; and
   a memory coupled to the at least one processor.

5. The apparatus of claim 4, wherein the at least one processor determines whether the identifier matches an advertised CSG identifier.

6. The apparatus of claim 4, wherein the at least one processor determines whether the identifier is different from an advertised CSG identifier.

7. An apparatus for providing access point information, comprising:
   means for receiving, at a target access point from a source access point, a request for an address to communicate with the target access point, wherein the target access point and the source access point are not initially in direct communication and said request transmitted through at least one network between the target access point and the source access point;
   means for transmitting to the source access point a local network address of the target access point, a label for the local network address, a wireless operator network address of the target access point, and a label for the wireless operator network address;
   means for determining by the source access point whether to establish a connection to the target access point using the local network address or the wireless operator network address based at least in part on an identifier from a measurement report wherein the identifier is a closed subscriber group (CSG) identifier of the local network or the identifier is a physical cell identifier of a macrocell access point of the wireless operator network address; and
   means for establishing an interface from the source access point with the local network, the wireless operator network, or both, the source access point receiving a local address from the local network, the wireless operator network, or both, and thereby establishing an interface with target access point.

8. The apparatus of claim 7, wherein the means for transmitting determines whether the identifier matches an advertised CSG identifier.

9. The apparatus of claim 7, wherein the means for transmitting determines whether the identifier does not match an advertised CSG identifier.

10. A computer program product for providing access point information, comprising:
    a non-transitory computer-readable medium, comprising:
    code for causing at least one computer to receive, at a target access point from a source access point, a request for an address to communicate with the target access point, wherein the target access point and the source access point are not initially in direct communication and said request transmitted through at least one network between the target access point and the source access point, code for sending to the source access point a local network address of the target access point, a label for the local network address, a wireless operator network address of the target access point, and a label for the wireless operator network address; and code for causing the at least one computer to determine whether to establish a connection to the target access point using the local network address or the wireless operator network address based at least in part on an identifier from a measurement report wherein the identifier is a closed subscriber group (CSG) identifier of the local network or the identifier is a physical cell identifier of a macrocell access point of the wireless operator network address; and code for causing the at least one computer to establish an interface from the source access point with the local network, the wireless operator network, or both, and for sending to the source access point a local address from the local network, the wireless operator network, or both, and thereby establishing an interface with target access point.

11. The computer program product of claim 10, wherein the code for causing the at least one computer to determine determines whether the identifier matches an advertised CSG identifier.

12. The computer program product of claim 10, wherein the code for causing the at least one computer to determine determines whether the identifier is different from an advertised CSG identifier.

13. An apparatus for providing access point information, comprising:

an address request receiving component for obtaining, at a target access point from a source access point, a request for an address to communicate with the target access point, wherein the target access point and the source access point are not initially in direct communication and said request transmitted through at least one network between the target access point and the source access point; and an address providing component for transmitting a local network address of the target access point, a label for the local network address, a wireless operator network address of the target access point, a label for the wireless operator network address, and an identifier that is a closed subscriber group (CSG) identifier of the local network or the identifier is a physical cell identifier of a macrocell access point of the wireless operator network address.

14. A method of wireless communication, comprising:

receiving, at a source access point from a target access point, a local network address of the target access point, a label for the local network address, a wireless operator network address of the target access point, and a label for the wireless operator network address to communicate with the target access point, wherein the target access point and the source access point are not initially in direct communication and said request transmitted through at least one network between the target access point and the source access point;

determining whether to establish a connection to the target access point using the local network address or the wireless operator network address based at least in part on an identifier from a measurement report wherein the identifier is a closed subscriber group (CSG) identifier of the local network or the identifier is a physical cell identifier of a macrocell access point of the wireless operator network address; and, establishing an interface from the source access point with the local network, the wireless operator network, or both, the source access point receiving a local address from the local network, the wireless operator network, or both, and thereby establishing an interface with target access point.

15. The method of claim 14, wherein the received parameter is a CSG identifier, further comprising comparing the CSG identifier to one or more local CSG identifiers.

16. The method of claim 15, wherein the determining comprises determining an address of the target access point with a label specifying a local network address, wherein the CSG identifier matches the one or more local CSG identifiers.

17. The method of claim 15, wherein the determining comprises determining an address of the target access point with a label specifying a wireless operator network address, wherein the CSG identifier does not match the one or more local CSG identifiers.

18. An apparatus for receiving access point information, comprising:

at least one processor configured to:

receive, at a source access point from a target access point, a local network address of the target access point, a label for the local network address, a wireless operator network address of the target access point, and a label for the wireless operator network address, wherein the target access point and the source access point are not initially in direct communication and said request transmitted through at least one network between the target access point and the source access point, and determine whether to establish a connection to the target access point using the local network address or the wireless operator network address based at least in part on an identifier from a measurement report wherein the identifier is a closed subscriber group (CSG) identifier of the local network or the identifier is a physical cell identifier of a macrocell access point of the wireless operator network address; and establish an interface from the source access point with the local network, the wireless operator network, or both, the source access point receiving a local address from the local network, the wireless operator network, or both, and thereby establishing an interface with target access point; and a memory coupled to the at least one processor.

19. The apparatus of claim 18, wherein the processor is further configured to compare the CSG identifier to one or more local CSG identifiers.

20. The apparatus of claim 19, wherein the at least one processor determines wherein the CSG identifier matches the one or more local CSG identifiers.

21. The apparatus of claim 19, wherein the at least one processor determines wherein the CSG identifier does not match the one or more local CSG identifiers.

22. A computer program product for receiving access point information, comprising:

a non-transitory computer-readable medium, comprising:

code for causing at least one computer to receive, at a source access point from a target access point, wherein the target access point and the source access point are not initially in direct communication and said request transmitted through at least one network between the target access point and the source access point, a local network address of the target access point, a label for the local network address, a wireless operator network address of the target access point, and a label for the wireless operator network address to communicate with the target access point, and code for causing the at least one computer to determine whether to establish a connection to the target access point using the local network address or the wireless operator network address based at least in part on an identifier from a measurement report wherein the identifier is a closed subscriber group (CSG) identifier of the local network or the identifier is a physical cell identifier of a macrocell access point of the wireless operator network address; and code for causing the at least one computer to establishing an interface from the source access point with the local network, the wireless operator network, or both, the source access point receiving a local address from the local network, the wireless operator network, or both, and thereby establishing an interface with target access point.

23. The computer program product of claim 22, wherein the computer-readable medium further comprises code for causing the at least one computer to compare the CSG identifier to one or more local CSG identifiers.

24. The computer program product of claim 23, wherein the code for causing the at least one computer to determine determines whether the CSG identifier matches the one or more local CSG identifiers.

25. The computer program product of claim 23, wherein the code for causing the at least one computer to determine determines whether the CSG identifier does not match the one or more local CSG identifiers.

26. An apparatus for receiving access point information, comprising:
- an address receiving component for receiving, at a source access point from a target access point, a local network address of the target access point, a label for the local network address, a wireless operator network address of the target access point, and a label for the wireless operator network address to communicate with the target access point, wherein the target access point and the source access point are not initially in direct communication and said request is transmitted through at least one network between the target access point and the source access point; and
- an interface establishing component for requesting establishment of an interface from the source access point to the local network, the wireless operator network, or both, the source access point receiving a local address from the local network, the wireless operator network, or both, and thereby establishing an interface with the target access point.

27. The apparatus of claim 26, wherein the interface establishing component compares a CSG identifier to one or more local CSG identifiers.

28. The apparatus of claim 27, wherein the CSG identifier matches the one or more local CSG identifiers.

29. The apparatus of claim 27, wherein the CSG identifier does not match the one or more local CSG identifiers.

30. A method of wireless communication, comprising:
- receiving target access point information comprising a local network address of a target access point, a label for the local network address, a wireless operator network address of the target access point, and a label for the wireless operator network address from the target access point assigned by the one or more network components, at a network entity from one or more network components, said network components including the target access point and the source access point wherein the target access point and the source access point are not initially in direct communication and said request transmitted through at least one network between the target access point and the source access point;
- receiving, at the network entity, a request from a source access point for an address to communicate with the target access point; and
- providing the target access point information to the source access point.

31. The method of claim 30, further comprising providing a label for the source access point.

32. The method of claim 30, further comprising communicating a CSG identifier to the source access point.

33. An apparatus for providing access point information, comprising:
- at least one processor configured to perform the steps of the method of claim 30; and
- a memory coupled to the at least one processor.

34. The apparatus of claim 33, wherein the at least one processor is further configured to provide a label for the source access point.

35. The apparatus of claim 33, wherein the processor is further configured to communicate a CSG identifier to the source access point.

36. An apparatus for providing access point information, comprising:
- means for receiving target access point information comprising a local network address of a target access point, a label for the local network address, a wireless operator network address of the target access point, and a label for the wireless operator network address from the target access point assigned by the one or more network components, at a network entity from one or more network components, said network components including the target access point and the source access point wherein the target access point and the source access point are not initially in direct communication and said request transmitted through at least one network between the target access point and the source access point;
- means for receiving, at the network entity, a request from a source access point for an address to communicate with the target access point; and
- means for providing the target access point information to the source access point.

37. The apparatus of claim 36, wherein the means for providing further indicates a label for at least a portion of the plurality of addresses to the source access point.

38. The apparatus of claim 36, wherein the means for providing further communicates a CSG identifier to the source access point with the plurality of addresses.

39. A computer program product for providing access point information, comprising:
- a non-transitory computer-readable medium, comprising:
  - code for causing at least one computer to receive target access point information comprising a local network address of a target access point, a label for the local network address, a wireless operator network address of the target access point, and a label for the wireless operator network address from the target access point assigned by the one or more network components, at a network entity from one or more network components, said network components including the target access point and the source access point wherein the target access point and the source access point are not initially in direct communication and said request transmitted through at least one network between the target access point and the source access point;
  - code for causing the at least one computer to receive, at the network entity, a request from a source access point for an address to communicate with the target access point; and
  - code for causing the at least one computer to provide the target access point information to the source access point.

40. The computer program product of claim 39, wherein the computer-readable medium further comprises code for causing the at least one computer to provide a label for at least a portion of the plurality of addresses to the source access point.

41. The computer program product of claim 39, wherein the computer-readable medium further comprises code for causing the at least one computer to communicate a CSG identifier to the source access point with the plurality of addresses.

42. An apparatus for providing access point information, comprising:
- a network address component for receiving, at a network entity from one or more network components, target access point information comprising a local network address of a target access point, a label for the local network address, a wireless operator network address of the target access point, and a label for the wireless operator network address from the target access point assigned by the one or more network components, at a network entity from one or more network components, said network components including the target access point and the source access point wherein the target access point and the source access point are not initially in direct communication and said request transmitted through at least one network between the target access point and the source access point;

an address request receiving component for obtaining, at the network entity, a request from a source access point for an address; and an address providing component for communicating the target access point information to the source access point.

43. The apparatus of claim 42, wherein the address providing component further communicates a label for at least a portion of the plurality of addresses to the source access point.

44. The apparatus of claim 42, wherein the address providing component further communicates a CSG identifier to the source access point with the plurality of addresses.

* * * * *